US012431713B2

(12) United States Patent
Chinthavali et al.

(10) Patent No.: US 12,431,713 B2
(45) Date of Patent: Sep. 30, 2025

(54) POWER ELECTRONIC REGULATOR

(71) Applicant: UT-Battelle, LLC, Oak Ridge, TN (US)

(72) Inventors: Madhu Sudhan Chinthavali, Oak Ridge, TN (US); Michael Starke, Oak Ridge, TN (US); Radha Krishna Moorthy, Oak Ridge, TN (US); Steven Campbell, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 191 days.

(21) Appl. No.: 17/989,376

(22) Filed: Nov. 17, 2022

(65) Prior Publication Data

US 2023/0155389 A1    May 18, 2023

Related U.S. Application Data

(60) Provisional application No. 63/280,159, filed on Nov. 17, 2021, provisional application No. 63/280,160, filed on Nov. 17, 2021, provisional application No. 63/280,158, filed on Nov. 17, 2021.

(51) Int. Cl.
| | |
|---|---|
| H02J 3/38 | (2006.01) |
| H02B 1/00 | (2006.01) |
| H02J 1/08 | (2006.01) |
| H02J 1/14 | (2006.01) |
| H02J 3/06 | (2006.01) |
| H02J 3/16 | (2006.01) |

(52) U.S. Cl.
CPC ............. *H02J 3/381* (2013.01); *H02B 1/00* (2013.01); *H02J 1/084* (2020.01); *H02J 1/14* (2013.01); *H02J 3/06* (2013.01); *H02J 3/16* (2013.01); *H02J 2203/20* (2020.01)

(58) Field of Classification Search
CPC .... H02J 3/381; H02J 1/084; H02J 1/14; H02J 3/06; H02J 3/16; H02J 2203/20; H02J 3/46; H02B 1/00
USPC .......................................................... 307/11
See application file for complete search history.

(56) References Cited

U.S. PATENT DOCUMENTS

| | | | |
|---|---|---|---|
| 2013/0249300 A1* | 9/2013 | Fishman | ........... H01L 31/02016 307/82 |
| 2016/0087433 A1 | 3/2016 | Matan et al. | |
| 2021/0296898 A1* | 9/2021 | Padmarao | .......... G05B 13/0265 |

OTHER PUBLICATIONS

Cai, N. et al., "A Hierarchical Multi-agent Control Scheme for a Black Start-Capable Microgrid," in Proc. 2011 IEEE Power and Energy Society General Meeting, Detroit, Michigan, Oct. 2011, pp. 1-7.
Monti, A. et al., "PEBB Standardization for High-Level Control: A Proposal," IEEE Trans. Ind Electron., vol. 59, No. 10, Nov. 2011, pp. 3700-3709.
Yang, S. et al., "Shipboard PEBB Cooling Strategies," in Proc. 2019 IEEE Electric Ship Technologies Symposium (ESTS), Sep. 2019, Washington, D.C., pp. 24-31.

(Continued)

*Primary Examiner* — Richard Tan
(74) *Attorney, Agent, or Firm* — Warner Norcross + Judd LLP

(57) ABSTRACT

A hierarchical approach is provided to integrate functions and components into the various systems and subsystems within a distribution network, including standardization of modular and scalable power electronics power blocks with embedded diagnostics and prognostics.

26 Claims, 26 Drawing Sheets

(56) References Cited

OTHER PUBLICATIONS

Iyer, A. et al., "Validation of Plug-and-Play AC/AC Power Electronics Building Block (AC-PEBB) for Medium Voltage Grid Control Applications," IEEE Trans. Ind. Appls., vol. 50, No. 5, Feb. 2014, pp. 2544-2551.

Starke, M. et al., "A Plug-and-Play Design Suite of Converters for the Electric Grid," in Proc. 2020 IEEE Energy Conversion Congress and Exposition, Detroit, Michigan, Oct. 2020, pp. 2314-2321.

"60 years of HVDC", Special Report, ABB Review, 2014, pp. 1-72.

Boroyevich, D. et al., "Intergrid: A Future Electronic Energy Network?" IEEE Journal of Emerging and Selected Topics in Power Electronics, vol. 1, No. 3, Sep. 2013, pp. 127-138.

Miret, J. et al., "Selective Harmonic-Compensation Control for Single-Phase Active Power Filter With High Harmonic Rejection," IEEE Trans. Ind. Electron., vol. 56, No. 8, Aug. 2009, pp. 3117-3127.

Li, Z. et al., "Control of Grid-Forming Inverter Based on Sliding-Mode and Mixed H2/H∞ Control," IEEE Trans. Ind. Electron., vol. 64, No. 5, May 2017, pp. 3862-3872.

Guerra, G. et al., "A Solid-State Transformer model for power flow calculations," International Journal of Electrical Power & Energy Systems, vol. 89, Jul. 2017, pp. 40-51.

Salcedo, R. et al., "Benefits of a Nonsynchronous Microgrid on Dense-Load LV Secondary Networks" IEEE Transactions on Power Delivery, vol. 31 No. 3, Jun. 2016, pp. 1076-1084.

Moorthy, R.S.K et al., "Architecture of a Residential Solid State Power Substation (SSPS) Node," in Proc. IEEE Power and Energy Society Innovative Smart Grid Technologies Conference, Feb. 2021, Washington, D.C., pp. 1-5.

Zia, M. F. et al., "Microgrid Transactive Energy: Review, Architectures, Distributed Ledger Technologies, and Market Analysis," IEEE Access, vol. 8, Jan. 2020, pp. 19410-19432.

Dragičević, T. et al., "Artificial Intelligence Aided Automated Design for Reliability of Power Electronic Systems," EEE Trans. Power Electron., vol. 34, No. 8, Aug. 2019, pp. 7161-7171.

Sarkar, M. N. I. et al., "Reactive Power Management in Renewable Rich Power Grids: A Review of Grid-Codes, Renewable Generators, Support Devices, Control Strategies and Optimization Algorithms," IEEE Access, vol. 6, 2018, pp. 41458-41489.

Liu, Q. et al., "Review and Comparison of Grid-Tied Inverter Controllers in Microgrids," IEEE Trans. Power Electron., vol. 35, No. 7, Jul. 2020, pp. 7624-7639.

Peng, Q. et al., "On the Stability of Power Electronics-Dominated Systems: Challenges and Potential Solutions," IEEE Trans. Ind. Appls., vol. 55, No. 6, Nov.-Dec. 2019, pp. 7657-7670.

Zhao, S. et al., "An Overview of Artificial Intelligence Applications for Power Electronics," IEEE Trans. Power Electron., vol. 36, No. 4, Apr. 2021, pp. 4633-4658.

Ghandhi O., "Review of Optimization of Power Dispatch in Renewable Energy System," in Proc. 2016 IEEE Innovative Smart Grid Technologies—Asia (ISGT-Asia), Melbourne, VIC, Australia, 2016, pp. 250-257.

"IEEE Standard for Interconnection and Interoperability of Distributed Energy Resources with Associated Electric Power Systems Interfaces," IEEE Std 1547-2018 (Revision of IEEE Std 1547-2003), Apr. 2018, pp. 1-138.

Chinthavali, M. et al., "Standard Modular Architectures for Consumer End Plug and Play Interfaces," in Proc. IEEE Applied Power Electronics Conference and Exposition, Jun. 2021, Phoenix, AZ, pp. 2105-2122.

Starke, M. et al., "Agent-Based Framework for Supporting Behind the Meter Transactive Power Electronic Systems," In Proc. IEEE Innovative Smart Grid Technologies, Washington D.C., Feb. 2020, pp. 1-5.

Starke, M. et al., "Networked Control and Optimization for Widescale Integration of Power Electronic Devices in Residential Homes," in Proc. IEEE Energy Conversion Congress and Expo, 2019, pp. 3496-3501.

Yu, J. et al., "MAS-Based Energy Management Strategies for a Hybrid Energy Generation System," IEEE Trans. Ind. Electron., vol. 63, No. 6, Jun. 2016, pp. 3756-3764.

\* cited by examiner

ENABLED FUNCTIONS OF SSPS FOR DISTRIBUTION NETWORK

| # | FUNCTION | ACTION TIME REQUIREMENT | CONTROLLED STATES | DECISION VARIABLE | OBJECTIVES |
|---|---|---|---|---|---|
| F1 | POWER AND ENERGY MANAGEMENT | IN THE ORDER OF MINUTES | P OF EACH INVERTER/LOAD | P OF EACH INVERTER/LOAD | MIN ENERGY COST |
| F2 | FREQUENCY SUPPORT | IMMEDIATE | DROOP CURVES OF EACH INVERTER/LOAD | DROOP CURVES OF EACH INVERTER/LOAD | MIN FREQUENCY DEVIATION (ISLANDED MODE) |
| F3 | VOLTAGE SUPPORT (PQ) | >1 MINUTE | P & Q OF EACH INVERTER/LOAD | P & Q OF EACH INVERTER/LOAD | MIN VOLTAGE DEVIATION + REACTIVE POWER COST |
| F3 | VOLTAGE SUPPORT (VOLT-VAR, VOLT-WATT ETC.) | 0.5 SEC TO 1 MINUTE | P & Q OF EACH INVERTER/LOAD | P & Q OF EACH INVERTER/LOAD | MINIMIZE VOLTAGE DEVIATIONS |
| F4 | FLICKER REDUCTION | SHORT TERM: 10 MINS LONG TERM: 2 HOURS | INSTANTANEOUS P & Q OF SELECTED INVERTER | P & Q OF SELECTED INVERTER | VOLTAGE FLICKER COMPENSATED |
| F5 | POWER FACTOR CORRECTION | TENS OF SECONDS | Q OF EACH INVERTER/LOAD | Q OF EACH INVERTER/LOAD | MIN $Q\_PCC$ |
| F6 | PHASE BALANCING & LIMITS ON SEQUENCE COMPONENTS | IN THE ORDER OF MINUTES | P OF EACH INVERTER/LOAD | P OF EACH INVERTER/LOAD | MIN PHASE POWER DIFFERENCE |
| F7 | ACTIVE HARMONIC FILTERING | TENS OF SECONDS | INSTANTANEOUS NTH ORDER CURRENT OF SELECTED INVERTER | N/A | HARMONIC COMPENSATION FOR NTH ORDER |
| F8 | GRID FORMING CAPABILITY (UNINTENTIONAL ISLANDING) | <6 FUNDAMENTAL CYCLES | V/F OF MASTER INVERTER; P AND Q OF REST INVERTER/LOAD | N/A | MIN TRANSIENTS DURING ISLANDING |
| F9 | BLACK START CAPABILITY (LOAD AND RESOURCE PICKUP INSIDE SSPS) | IN THE ORDER OF SECONDS/MINUTES | P AND Q OF EACH INVERTER/LOAD | P AND Q OF EACH INVERTER/LOAD | PICKUP CRITICAL LOADS+ NONCRITICAL LOADS |
| F10 | VOLTAGE AND FREQUENCY RIDE-THROUGH | <10 FUNDAMENTAL CYCLES | P AND Q OF EACH INVERTER/LOAD | N/A | REMAIN CONNECTED |
| F11 | ENERGY & POWER MANAGEMENT TO DELAY THE NEED FOR COSTLY UPGRADES (PEAK DEMAND REDUCTION) | TENS OF SECONDS | P AND Q OF EACH INVERTER/LOAD | P AND Q OF EACH INVERTER/LOAD | MIN $P\_PCC^2 + Q\_PCC^2$ |
| F12 | CYBER SECURITY | <2 OR 3 CONTROL CYCLES | N/A | N/A | VERIFY THE SENSOR MEASUREMENTS, REFERENCE SET C. FOR TAMPERING |

Fig. 31

SSPS - CONTROL MODES MAPPING

| # | FUNCTION | G | X (TRANSFORMER) | CONTROL MODES ESS (P CONTROL DEFAULT) | PV (MPPT DEFAULT) | LOAD |
|---|---|---|---|---|---|---|
| F1 | POWER AND ENERGY MANAGEMENT | - | - | P CONTROL | PV CURTAILMENT IF NEEDED, MPPT | - |
| F2 | FREQUENCY SUPPORT | - | - | FREQ-WATT | PV CURTAILMENT IF NEEDED, MPPT | - |
| F3 | VOLTAGE SUPPORT (PQ) | Q CONTROL, CONSTANT PF | - | Q CONTROL, CONSTANT PF, P AND Q CONTROL | Q CONTROL, CONSTANT PF | - |
|  | VOLTAGE SUPPORT (VOLT-VAR, VOLT-WATT, ETC.) | VOLT-VAR, CONSTANT Q | - | VOLT-VAR, VOLT-WATT, PQ | VOLT-VAR, VOLT-WATT | - |
| F4 | FLICKER REDUCTION | Q CONTROL | - | P CONTROL | P CONTROL | - |
| F5 | POWER FACTOR CORRECTION | Q CONTROL | - | CONSTANT PF | CONSTANT PF | - |
| F6 | PHASE BALANCING & LIMITS ON SEQUENCE COMPONENTS | - | - | P CONTROL | PV CURTAILMENT IF NEEDED | - |
| F7 | ACTIVE HARMONIC FILTERING | INSTANTANEOUS N-TH ORDER CURRENT CONTROL | - | - | - | - |
| F8 | GRID FORMING CAPABILITY (ISLANDING) | VOLT-VAR, CONSTANT Q | - | CONSTANT V/F | PV CURTAILMENT IF NEEDED, MPPT | $P_{ref}$ CONTROLIF CONTROLLABLE |
| F9 | BLACK START CAPABILITY (RESTORATION/ RESYNCHRONIZATION) | VOLT-VAR, CONSTANT Q | - | CONSTANT V/F | PV CURTAILMENT IF NEEDED/ MPPT | $P_{ref}$ CONTROLIF CONTROLLABLE |
| F10 | VOLTAGE AND FREQUENCY RIDE-THROUGH | RIDE-THROUGH MODE, VOLT-VAR (OPTIONAL) | - | RIDE-THROUGH MODE, VOLT-VAR (OPTIONAL) | RIDE-THROUGH MODE | - |
| F11 | ENERGY & POWER MANAGEMENT TO DELAY THE NEED FOR COSTLY UPGRADES (PEAK DEMAND REDUCTION) | Q CONTROL | - | P CONTROL | PV CURTAILMENT IF NEEDED/ MPPT | - |
| F12 | CYBERSECURITY | HARDWARE & SOFTWARE | HARDWARE & SOFTWARE | HARDWARE & SOFTWARE | HARDWARE & SOFTWARE | HARDWARE & SOFTWARE |

Fig. 32

POWER ELECTRONIC REGULATOR

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present disclosure relates to the field of distributed power generation, and more particularly toward managing power flow and power system protection for transmission and distribution of electric grid networks.

BACKGROUND

Conventional substations perform the functions of voltage transformation, electrical isolation, managing power flow and power system protection for transmission and distribution electric grid networks. Substations have been categorized based on location as generation, transmission, distribution, and switching. One type of conventional substation is solid-state power substation (SSPS) based on solid-state technology-based power semiconductor switches. An SSPS, also known as a converter substation, includes power electronic converter systems along with other substation equipment for filtering, monitoring, and protection. Some conventional solid-state substations are heavily concentrated at the transmission level. For instance, high voltage direct current (HVDC) substations, or early-stage solid-state substations, were primarily utilized for connecting AC grid networks operating at different frequencies.

The electric distribution grid is seeing an exponential growth in power electronics (PEs) and solid-state power substations. This is largely driven by the increase in generation assets like distributed generators (DGs), energy storage, new large electric vehicle loads, and data centers. Conventional PE technology is used in both the electric distribution grid and the consumer market. However, these convention PE solutions introduce new challenges as these PE systems, while electrically coupled into the greater utility infrastructure, operate independently based on specific design functions.

As conventional power distribution systems continue to evolve, with an increasing mix of PE distributed energy resources (DER) and controllable loads, substations have been deficient in regulating voltage, limiting fault current, tolerating faults, correcting for poor power factor and power quality. Many conventional PE systems have been designed to support one simple function: convert one voltage magnitude and type into another, while providing protection functionality to the interconnected resources.

Conventional hardware solutions, such as hybrid and solid-state transformers, have so far focused on specific functions such as voltage transformation and power factor control while also being more power dense than a winding-based transformer.

Back-to-back PE systems have also been used as conventional links between two asynchronous systems. These systems have been focused on either replacing the existing components or providing new topologies for grid infrastructure. System level solutions are based on load centric energy management philosophy and can only provide load optimization for economic benefits and load control. Vendor based solutions in this conventional realm rely on preset functions in converters with centralized control and smart interfaces for IOT enabled loads.

Some conventional DER based solid-state substations utilize modular systems. This approach aims to minimize the cost and time associated with grid interconnection through pre-assembly and factory testing. However, these modular designs still face several downsides. Specifically, unique vendor designs, proprietary software and communications interfaces, and lack of standards for communication and interfacing result in high balance of system (BOS) costs for operation and maintenance. Furthermore, conventional modular technologies lack autonomous operation capability, prognostics or diagnostics, real-time optimization and transactive capabilities, and cyber physical security for grid operations.

SUMMARY

In general, one innovative aspect of the subject matter described herein can be embodied in a solid-state power substation (SSPS) may include a plurality of smart universal power electronic regulators (SUPERs). The SSPS may include a first control system communicatively coupled to the plurality of SUPERs, where the first control system may be associated with one of a node or a hub. In the case of the first control system being associated with the node, the node may include the plurality of SUPERs connected together to a single point of connection of a power grid, where the point of connection includes one or two feeders. In the case of the first control system being associated with the hub, the hub may include the plurality of SUPERs, where a first one of the plurality of SUPERs is connected to a first feeder, where a second one of the plurality of SUPERs is connected to a second feeder. Each SUPER may include one or more intelligent power stages (IPSs) and may be configured to be operated according to one of a plurality of converter classes, where the plurality of converter classes include a DC load interface (DCLI), an AC load interface (ACLI), a DC source interface (DCSI), an AC source interface (ACSI), or a grid interface (GI).

The foregoing and other embodiments can each optionally include one or more of the following features, alone or in combination. In particular, one embodiment includes all the following features in combination.

In some embodiments, the point of connection of the power grid may include the first feeder, such that the first one of the plurality of SUPERs is connected to the point of connection of the power grid.

In some embodiments, the first one of the plurality of SUPERs may be connected to at least one feeder in addition to the first feeder, and where the second one of the plurality of SUPERs may be connected to at least one feeder in addition to the second feeder.

In some embodiments, the SSPS may include a second plurality of SUPERs and a second control system communicatively coupled to the second plurality of SUPERs.

In some embodiments, the first control system may be provided in the node, such that the node includes the plurality of SUPERS connected together to a single point of connection of the power grid. The second control system may be associated with the hub, which may include the second control system and the second plurality of SUPERs. A first one of the second plurality of SUPERs may be connected to a third feeder, and a second one of the second plurality of SUPERs may be connected to a fourth feeder.

In some embodiments, the hub controller may be operable to coordinate operation of the second plurality of SUPERs to control power flow between the first feeder and the second feeder.

In some embodiments, the hub controller may be operable to control voltage for at least one of the first and second feeders.

In some embodiments, the first feeder may operate at a first voltage and a first frequency. The second feeder may operate at a second voltage and a second frequency, and at least one of the first voltage and the first frequency may be different respectively from the second voltage and the second frequency.

In general, one innovative aspect of the subject matter described herein can be embodied in a solid-state power substation (SSPS). The SSPS may include a first plurality of smart universal power electronic regulators (SUPERs). Each of the first plurality of SUPERs may be operable to provide either a load interface to a load or a source interface to a feeder. The SSPS may include a second plurality of SUPERs. Each of the second plurality of SUPERs may be operable to provide a load interface to a feeder. The SSPS may include node with the first plurality of SUPERs connected together to a single point of connection of a power grid, and a node controller associated with the node. The node controller may be communicatively coupled to the first plurality of SUPERs of the node. The node controller may be operable to direct operation of the first plurality of SUPERs to control power for at least one of the load and the feeder. The SSPS may include a hub with the second plurality of SUPERs. A first one of the second plurality of SUPERs may be connected to a first feeder, and a second one of the second plurality of SUPERs may be connected to a second feeder. The SSPS may include a hub controller associated with the hub. The hub controller may be communicatively coupled to the second plurality of SUPERs of the hub, and may be operable to direct operation of the SUPERs to control power flow between the first and second feeders.

The foregoing and other embodiments can each optionally include one or more of the following features, alone or in combination. In particular, one embodiment includes all the following features in combination.

In some embodiments, the hub controller and the node controller may be provided by a server system remote from the first and second pluralities of SUPERs.

In some embodiments, the SSPS may be associated with an SSPC controller operable to direct operation of the node and hub controllers of the SSPS.

In some embodiments, the SSPS controller may be communicatively coupled to a domain controller associated with a power transmission substation.

In some embodiments, the first feeder may be coupled to the hub, and where the single point of connection of the power grid may correspond to the first feeder.

In general, one innovative aspect of the subject matter described herein can be embodied a power distribution system with a plurality of smart universal power electronic regulators (SUPERs), and a control system communicatively coupled to the plurality of SUPERs. The power distribution system may include a first one of the plurality of SUPERs connected to and operably coupled to a first feeder, where the first one of the plurality of SUPERs may be configured to control a characteristic of power associated with the first feeder. Each SUPER may include one or more intelligent power stages (IPSs) and may be configured to be operated according to one of a plurality of converter classes. The plurality of converter classes may include a DC load interface (DCLI), an AC load interface (ACLI), a DC source interface (DCSI), an AC source interface (ACSI), or a grid interface (GI).

The foregoing and other embodiments can each optionally include one or more of the following features, alone or in combination. In particular, one embodiment includes all the following features in combination.

In some embodiments, the first one of the SUPERs may be configured to control the characteristic of power received from the first feeder.

In some embodiments, the first one of the SUPERs may be configured to control the characteristic of power provided to the first feeder.

In some embodiments, the plurality of SUPERs may be provided in a node of the power distribution system, where the plurality of SUPERS may be connected together to a single point of connection of a power grid, and where the single point may include the first feeder.

In some embodiments, a second plurality of SUPERs may be provided in a hub of the power distribution system, where a first one of the second plurality of SUPERs may be connected to a second feeder and a second one of the second plurality of SUPERs may be connected to a third feeder. A second control system may be communicatively coupled to the second plurality of SUPERs and operable to control power flow between the second and third feeders.

In some embodiments, the plurality of SUPERs may be provided in a hub of the power distribution system, where a second one of the plurality of SUPERs may be connected to a second feeder, and where the control system may be operable to control power flow between the first and second feeders.

In some embodiments, the second feeder may operate at a second voltage and a second frequency. The third feeder may operate at a third voltage and a third frequency. At least one of the second voltage and the second frequency may be different respectively from the third voltage and the third frequency.

In general, one innovative aspect of the subject matter described herein can be embodied in a solid-state power substation (SSPS) including a plurality of smart universal power electronic regulators (SUPERs). Each SUPER may include an intelligent power stage (IPS) operable to control power transferred through the SUPER from a power input to a power output. The plurality of SUPERs may include multiple SUPERs each configured according to one of a plurality of converter classes, where the plurality of converter classes includes a DC load interface (DCLI) and an AC load interface (ACLI). The SSPS may include a feeder operable to supply or receive power from a SUPER of the plurality of SUPERs. Each of the plurality of SUPERs may be configured to control a characteristic of the power transferred from the power input to the power output. Each of the plurality of SUPERs may include a controller operable to transmit and receive communications from an upper level control system. The controller may be operable to receive and operate according to SUPER constraints received from the upper level control system. The controller may be operable to transmit sensor information to the upper level control system.

The foregoing and other embodiments can each optionally include one or more of the following features, alone or in combination. In particular, one embodiment includes all the following features in combination.

In some embodiments, the plurality of converter classes may include an AC source interface (ACSI) and a DC source interface (DCSI).

In some embodiments, the plurality of converter classes may include a grid interface (GI).

In some embodiments, the IPS may be operable to receive DC power at a power input and to generate AC power at the power output.

In some embodiments, the AC power may be single-phase or three-phase power.

In some embodiments, the controller may be operable to direct power regulation and control modes for apparent power and reactive power.

In some embodiments, the IPS may be configured transfer power from the power input to the power output according to IPS constraints received from the controller. The controller may determine the IPS constraints based on the SUPER constraints.

In some embodiments, the IPS may be configured to communicate IPS sensor information to the controller. The controller may be configured to determine the sensor information based on the IPS sensor information.

In some embodiments, the SSPS may be based on the constraints received from the upper level controller. The controller may be configured to direct operation of the IPS to control voltage, current, phase, and balancing.

In general, one innovative aspect of the subject matter described herein can be embodied in an SSPS for a power distribution system. The SSPS may include a plurality of smart universal power electronic regulators (SUPERs), where each SUPER may include an intelligent power stage (IPS) operable to control power transferred through the SUPER from a power input to a power output. The plurality of SUPERs may include multiple SUPERs each configured according to one of a plurality of converter classes. The plurality of SUPERs including a standardized input interface and a standardized output interface for all of the plurality of converter classes. The plurality of converter classes may include a DC load interface (DCLI) and an AC load interface (ACLI). Each of the plurality of SUPERs may be configured to control a characteristic of the power transferred from the power input to the power output in accordance with commands received via the standardized input interface. Each of the plurality of SUPERs may include a controller operable to transmit and receive communications from an upper level control system, where the controller is operable to receive and operate according to SUPER constraints received from the upper level control system. The controller may be operable to transmit sensor information to the upper level control system in accordance with the standardized output interface.

The foregoing and other embodiments can each optionally include one or more of the following features, alone or in combination. In particular, one embodiment includes all the following features in combination.

In some embodiments, the controller may include the standardized input interface. The controller may be configured to operate based on the commands received via the standardized input interface.

In some embodiments, the controller may include the standardized output interface, where the upper level control system may be standardized to receive sensor information according to the standardized output interface from the plurality of SUPERs.

In some embodiments, the plurality of converter classes may include an AC source interface (ACSI) and a DC source interface (DCSI).

In some embodiments, the plurality of converter classes may include a grid interface (GI).

In some embodiments, the IPS may be operable to receive DC power at a power input and to generate AC power at the power output.

In some embodiments, the AC power may be single-phase or three-phase power.

In some embodiments, the controller may be operable to direct power regulation and control modes for apparent power and reactive power.

In some embodiments, the IPS may be configured transfer power from the power input to the power output according to IPS constraints received from the controller. The controller may determine the IPS constraints based on the SUPER constraints.

In some embodiments, the IPS may be configured to communicate IPS sensor information to the controller, and where the controller may be configured to determine the sensor information based on the IPS sensor information.

In some embodiments, based on the constraints received from the upper level controller, the controller may be configured to direct operation of the IPS to control voltage, current, phase, and balancing.

In general, one innovative aspect of the subject matter described herein can be embodied in a power distribution system including a first solid-state power substation (SSPS) with a first plurality of smart universal power electronic regulators (SUPERs). The first plurality of SUPERs may include multiple SUPERs each configured according to one of a first set of converter classes. The system may include a first SSPS control system operable to direct operation of the first SSPS including the first plurality of SUPERs.

The system may include a second solid-state power substation (SSPS) with a second plurality of smart universal power electronic regulators (SUPERs). The second plurality of SUPERs may include multiple SUPERs each configured according to one of a second set of converter classes. The system may include a second SSPS control system operable to direct operation of the second SSPS including the second plurality of SUPERs.

The first plurality of converter classes may include a load-facing converter, and where the second plurality of converter classes may include a grid-facing converter.

The system may include a power distribution control system operably coupled to the first and second SSPS control systems. The power distribution system may be configured to direct operation of the first and second SSPSs, via the first and second SSPS control systems, to control one or more of a target voltage level, a target AC load, a target AC source, a target DC load, and a target DC source.

The foregoing and other embodiments can each optionally include one or more of the following features, alone or in combination. In particular, one embodiment includes all the following features in combination.

In some embodiments, the first plurality of converter classes may include a grid-facing converter and an interfacing converter.

In some embodiments, the second plurality of converter classes may include a load-facing converter and an interfacing converter.

In some embodiments, a first one of the SUPERs may be configured as the load-facing converter provides an AC load interface (ACLI). A second one of the SUPERs may be configured as the load-facing converter provides a DC load interface (DCLI).

In some embodiments, the ACLI may be operable to provide to AC power that is single-phase or three-phase power.

In some embodiments, a first one of the SUPERs configured as the interfacing converter may provide an AC source interface (ACSI). A second one of the SUPERs configured as the load-facing converter may provide a DC source interface (DCSI).

In some embodiments, each of the first and second pluralities of SUPERs may be configured to control a characteristic of the power transferred from a power input to a power output. Each of the first plurality of SUPERs may include a controller operable to transmit and receive communications from the first control system. Each of the second plurality of SUPERs may include a controller operable to transmit and receive communications from the second control system. The controller of the first and second plurality of SUPERs may be operable to receive and operate according to SUPER constraints received from an upper level control system. The controller may be operable to transmit sensor information to the upper level control system.

In some embodiments, the upper-level control system may correspond to one of the first and second control systems in communication with the respective SUPER.

In some embodiments, the constraints may be received from the upper level controller. The controller may be configured to direct operation of the SUPER to control voltage, current, phase, and balancing.

In some embodiments, the controller may be operable to direct power regulation and control modes for apparent power and reactive power.

In some embodiments, the first and second control systems and the power distribution control system may communicate according to a standardized communication protocol, such that despite the first and second SSPSs being configured differently the first and second control systems may direct operation of the first and second SSPSs according to the same standardized protocol.

In general, one innovative aspect of the subject matter described herein can be embodied in a control system for managing power for first and second solid-state power substations (SSPS). The first SSPS may include a first plurality of SUPERs, and the second SSPS may include a second plurality of SUPERS. The control system may include a first SSPS controller operable to direct operation of the first SSPS including the first plurality of SUPERs. The control system may include a second SSPS controller operable to direct operation of the second SSPS including the second plurality of SUPERs. Each of the first plurality of SUPERs may include a first controller operable to receive and operate according to SUPER constraints received from the first SSPS controller, and each of the second plurality of SUPERs may include a second controller operable to receive and operate according to SUPER constraints received from the second SSPS controller.

The control system may include a power distribution controller operably coupled to the first and second SSPS controllers. The power distribution system may be configured to direct operation of the first and second SSPSs, via communication with the first and second SSPS controller, to affect operation of the first and second pluralities of SUPERs. The first and second SSPS controllers may be operable to determine SUPER constraints based on communications received from the power distribution controller and communications received respectively from the SUPERs among the first and second pluralities of SUPER. The first SSPC controller, the second SSPS controller, the first controller, the second controller, and the power distribution controller may communicate according to a standardized communication protocol, such that, despite the first and second SSPSs being configured differently, the first and second controller may direct operation of the first and second pluralities of SUPERs according to the same standardized protocol.

The foregoing and other embodiments can each optionally include one or more of the following features, alone or in combination. In particular, one embodiment includes all the following features in combination.

In some embodiments, the first plurality of SUPERs may include SUPERs respectively configured with one of a load-facing converter, a grid-facing converter, or an interfacing converter.

In some embodiments, the second plurality of SUPERs may include SUPERs respectively configured with one of a load-facing converter, a grid-facing converter, or an interfacing converter.

In some embodiments, a first SUPER configured as the grid-facing converter provides an AC source interface (ACSI), and wherein a second SUPER configured as the interfacing converter provides a DC source interface (DCSI).

In some embodiments, each of the first and second pluralities of SUPERs may be configured to control a characteristic of the power transferred from a power input to a power output.

In some embodiments, based on the SUPER constraints, the first and second controllers may be configured to direct operation of the SUPER to control voltage, current, phase, and balancing.

In some embodiments, the first and second controllers may be operable to direct power regulation and control modes for apparent power and reactive power.

In general, one innovative aspect of the subject matter described herein can be embodied in a method of managing power for a solid-state power substation (SSPS). The SSPS may include a plurality of SUPERs. The method may include negotiating, in an SSPS controller, power transfer from a power source to the plurality of SUPERs, and controlling supply of apparent and reactive power across the plurality of SUPERs. The method may include communicating a SUPER constraint to a first one of the plurality of SUPERs, and controlling, in a first SUPER, based on the SUPER constraint, at least one of voltage, current, phase, and balancing with respect to power transferred from a power input to a power output.

The foregoing and other embodiments can each optionally include one or more of the following features, alone or in combination. In particular, one embodiment includes all the following features in combination.

In some embodiments, the method may include communicating a SUPER constraint to each of the plurality of SUPERs, and controlling in each SUPER, based on the SUPER constraint, at least one of voltage, current, phase and balancing with respect to power transferred from a power input to a power output.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 31 shows a set of features for an SSPS in accordance with one embodiment.

FIG. 32 shows a set of features for an SSPS in accordance with one embodiment.

DETAILED DESCRIPTION

Figure 1A:
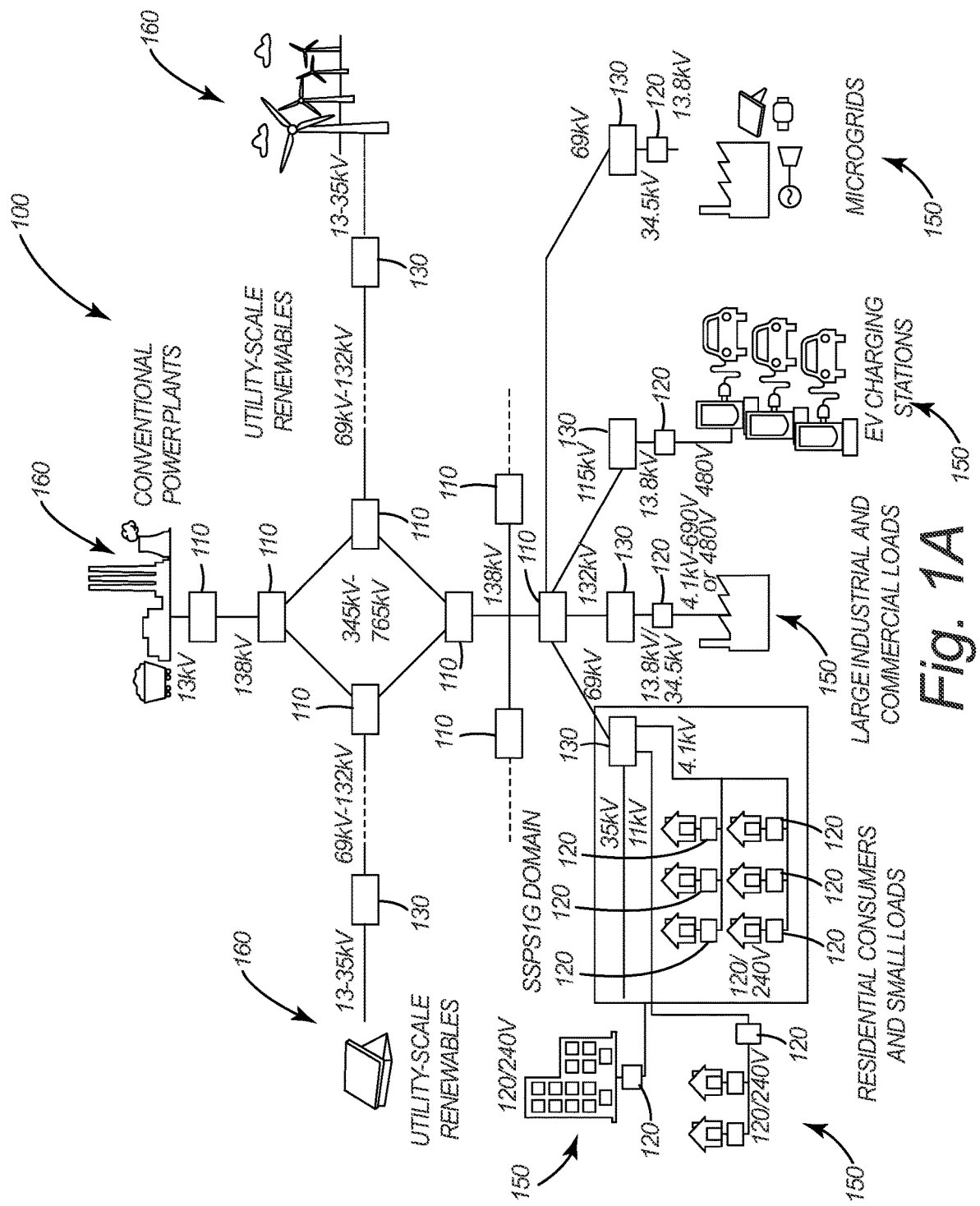
FIG. 1A shows a system in accordance with one embodiment.
Figure 1B:
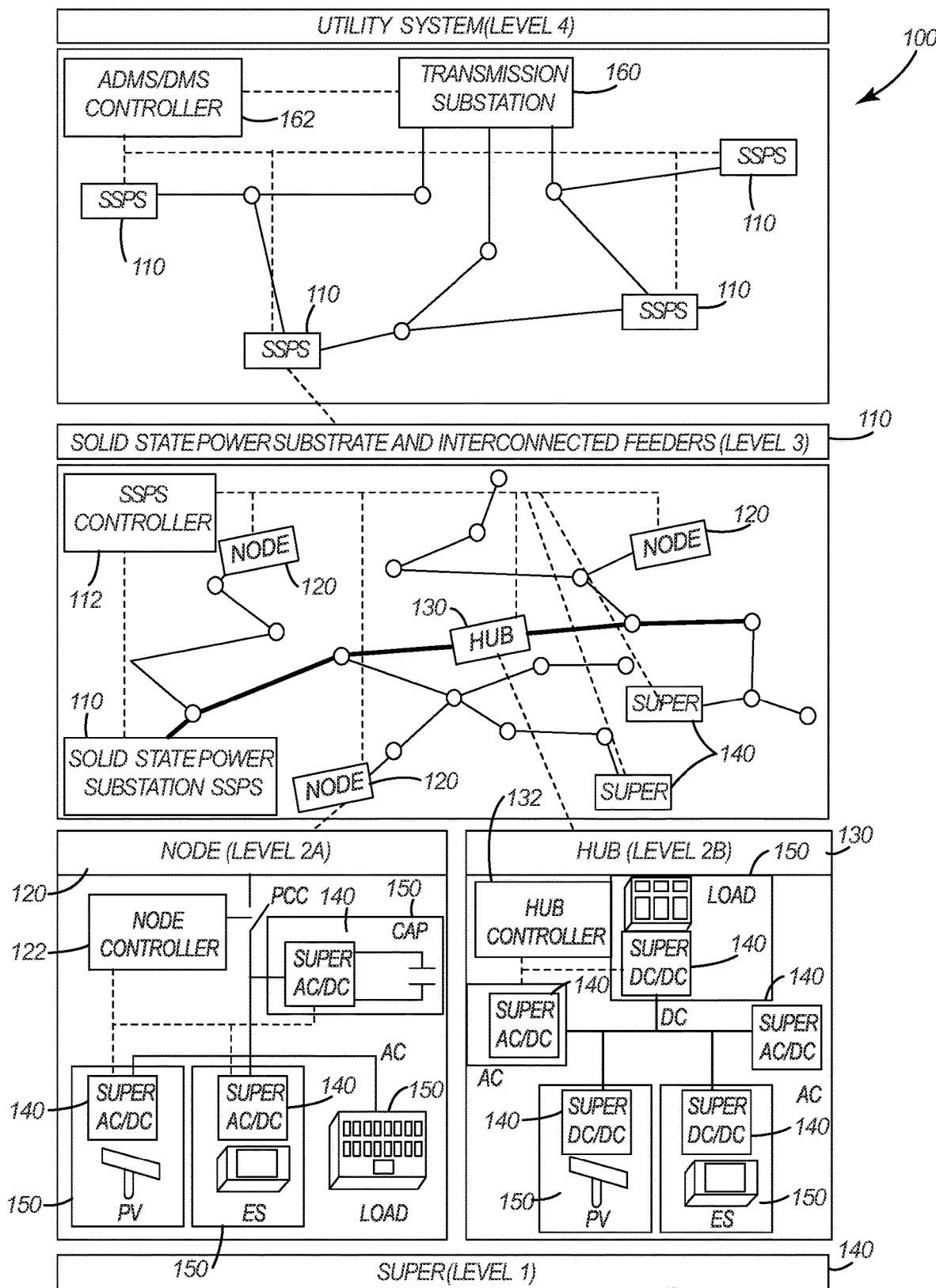
FIG. 1B shows the system of FIG. 1A in accordance with one embodiment.
Figure 2:
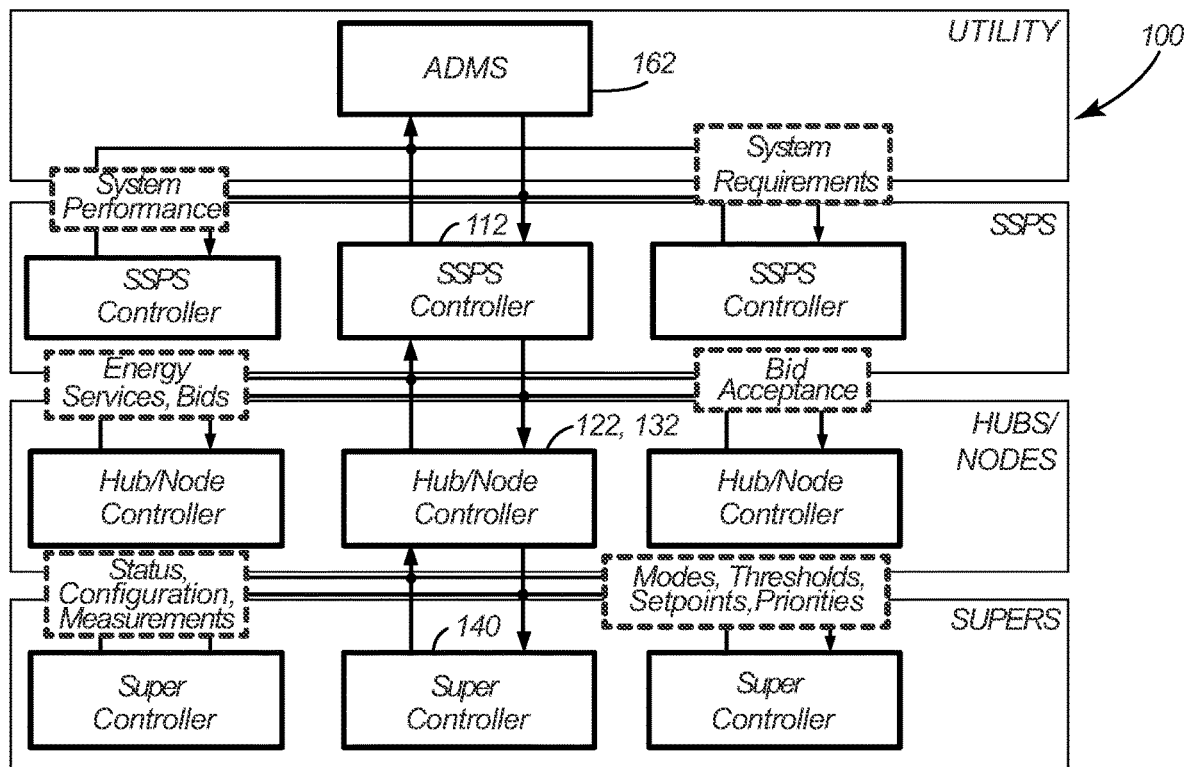
FIG. 2 shows communication, including information and/or message flow, in the system of FIG. 1A in accordance with one embodiment.
Figure 3:
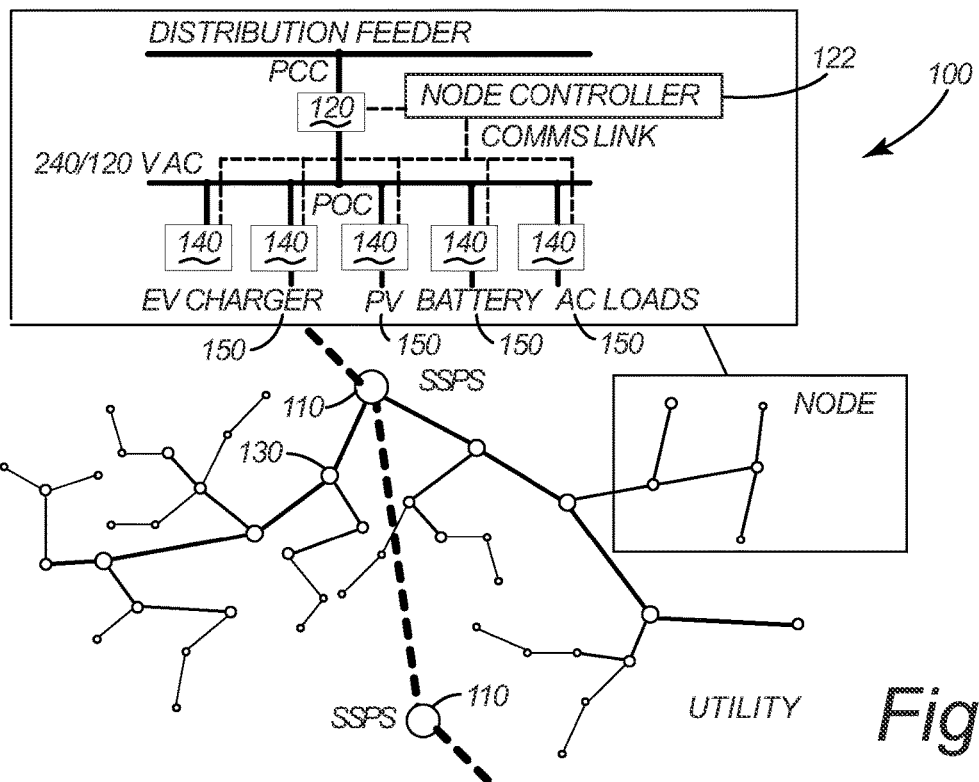
FIG. 3 shows a topology of the system of FIG. 1A in accordance with one embodiment.

In one embodiment according to the present disclosure, there are numerous capabilities that PE systems can add to the electric grid beyond a simple conversion of energy. PE systems have been shown to be able to support electric grid nodal voltage through dynamic control of reactive power, power quality improvement through harmonic cancellation, fast responsive control to provide grid resiliency through islanding, and direct and precise management of power. In one embodiment, providing and extracting value from these functions is based on orchestration of system hierarchies of the PE systems and integration into solid state power substations.

An SSPS in accordance with one embodiment may be classified based on voltage and power: distribution (SSPS up to 34.5 kV), sub-transmission (SSPS up to 138 kV) and transmission (SSPS greater than 138 kV).

An SSPS framework in accordance with one embodiment defines an architecture and associated layers for SSPS up to 35 kV. This includes linking everything between a grid-edge device to distribution scale solid state substations. While this configuration may not be described in conjunction with sub-transmission and transmission systems directly, the present disclosure is not so limited—the SSPS framework may be potentially applied in other systems including sub transmission and transmission systems powers greater than 35 kV.

In one embodiment, a hierarchical approach to integrate advance functions and components into the various systems and subsystems within the distribution network is provided, including standardization of modular and scalable PE power blocks with embedded diagnostics and prognostics. In one embodiment, with strategic integration of intelligent platforms and communication interfaces, PE systems in substations can be used to apply new grid functions and control flexibility to the grid. For instance, interoperability, wide-scale communication, and control, autonomous operations, and cyber security risks may be addressed in accordance with the one impediment. As another example, machine learning or artificial intelligence at the grid edge may provide or facilitate autonomous decision making of systems without resorting to fast communications and controls for a system of tens of thousands of devices.

One embodiment according to the present invention may include many levels of controllers and embedded intelligence to automate energy flow between sources and loads. These controllers can be hosted in physical platforms in a node, hub, or a solid-state substation or as a "virtual substation" residing in a cloud construct. To enhance grid reliability, resiliency, power quality, economics, and efficiency, the SSPS architecture may be standardized, modular, and scalable. The SSPS architecture may include one or more of different layers, controls, and protections.

The SSPS system may be based on hierarchical layers, which may include power electronic converters. An SSPS controller may control and coordinate the components (aggregators, such as nodes and hubs) of the system over a geographical area.

For instance, the SSPS-based system based on hierarchical layers may provide edge nodes that can transform the way the grid operates by establishing coordinated control in a single feeder, or between multiple feeders, and can enhance or maximize the grid support from the edge nodes. Interoperability and vendor agnostic configurations may be supported.

The SSPS-based system based on hierarchical layers may also provide a universal architecture that can enhance or maximize grid support functions from a single SSPS node, link, or hub by splitting the functions across various converters (e.g., SUPERs) in a multi-port framework. This configuration may also reduce the number of grid-connected nodes compared to conventional systems.

I. SSPS Aspects

The system in accordance with one embodiment of the present disclosure may facilitate control or mitigation over several aspects of power distribution.

For instance, with respect to voltage and frequency regulation, the SSPS may provide active and reactive support for voltage and frequency stabilization. The SSPS may enhance the power quality and prevent flicker. The SSPS may be configured to provide such support via control over apparent and reactive power (PQ), Volt-var control, or power factor control, or a combination thereof for power quality enhancement. The SSPS may provide control for correction of voltage deviations associated with flicker.

The SSPS can tackle phase imbalance by providing dynamic balance algorithms. The SSPS may be adapted for phase imbalance control by utilizing strategies such as Volt-var control for voltage stabilization or correction of sequence components.

Quick islanding and resynchronization may also be enabled by the SSPS with respect to islanding that is intentional or unintentional. This operability with respect to the SSPS may enhance safety for maintenance and limit energy delivered to a fault. Additional operability with respect to islanding includes providing reliable, low voltage ride through and fault ride through capabilities for inverter-based generation, black start capability, and ease of islanding resynchronization.

The SSPS in one embodiment can enable capacity expansion without the need for upgrading existing infrastructure. The DC coupled architecture of the SSPS may enable simplified integration of renewables and energy storage units and expansion. This may reduce the impact of higher penetration of distributed generation on existing utility equipment without requiring significant equipment upgrades.

The SSPS in one embodiment may provide voltage support and substantially eliminate the need for voltage regulators or capacitor banks in the Power Distribution system. Control algorithms for Volt-var, PQ, PV, or power oscillation damping, or a combination thereof, may be provided. The SPSS may be provided in a system with distributed intelligence for autonomous decision-making capabilities, such as mode changing capabilities for PQ and power factor based on local measurements.

In one embodiment, the SSPS may support active filtering or power factor correction with respect to harmonics caused by non-linear loads. Active filtering may be provided with respect to dominant harmonics (3rd, 5th, 7th . . . 11th), and a multi-port configuration may help to eliminate the need for diode-based power conversion stages or redundant power conversion stages. The SSPS in this configuration may help to enable loads with active front ends.

II. Overview

In FIGS. 1A, 1B, 2, 3, and 25, several examples of a power distribution system 100 are shown, including linkages of components and systems that depict various interconnections of several system components e.g., power electronic converters (PEC) aggregated as a node or a hub (in the form of SSPSs) to a distribution management system (DMS) or an advanced distribution management system (ADMS). The depicted configurations are hierarchal, such that a utility DMS controller 162 associated with a utility distribution system 160 need not have all the details of the PEC or an SSPS controller 112, but the DMS controller 162 may be provided with enough information to support decisions. The hierarchy in the illustrated embodiment includes four layers that each provide various features and capabilities. The layers are defined as follows:

Utility: Utility level layers may include wide area management systems, such as a DMS controller 162 or an advanced distribution management system (ADMS) controller, which may be based on a DMS controller 162 but with additional functionality. For purposes of disclosure, one or more embodiments are described herein in conjunction with a DMS or DMS controller 162; however, the DMS or DMS controller 162 may be respectively replaced with an ADMS or ADMS controller. The utility level layer may include a utility transmission system 160. The resource management systems within a utility distribution network may correspond to a DMS or an ADMS. The DMS or the ADMS may focus on managing the distribution voltage through control of capacitor banks and other substation equipment. An SSPS, described herein, may take directive from the DMS controller 162 to carry out voltage transformation, electrical isolation, managing power flow, and power system protection for distribution electric grid networks. The SSPS may incorporate and facilitate management of power distribution for assets 150, such as distributed generation (DG) and energy storage (ES), electric vehicle (EV) charging stations, and data centers. As described herein in conjunction with one embodiment, the DMS may form part of a hierarchal systems to sub-divide an optimization problem into different layers, potentially enhancing reliability and resiliency for a variety of applications, including microgrids, nano grids, and even hybrid AC-DC systems.

The utility level layer may represent the entire electrical network owned by a utility including the larger distribution network. The utility in this case may also operate the overall system through the DMS. For instance, the DMS may coordinate with SSPS controllers 112 to manage the distribution network voltage between a transmission substation 160 and SSPS 110.

SSPS: An SSPS level layer or SSPS 110 may include power electronics converter systems and an SSPS controller 112, along with other substation equipment for filtering, monitoring, and protection.

The SSPS 110 may reside within a substation. The SSPS controller 112 may be used to communicate and control devices within the SSPS 110 and coordinate the nodes 120, the hub 130, and free acting SUPERs 140 within the downstream feeders. The SSPS 110 may be configured to manage real and reactive power to support voltage and energy delivery within the substation and interconnected feeders.

Additional features of the SSPS 110 are depicted in the illustrated embodiments of FIGS. 31 and 32. It is to be understood that the SSPS 110 may be configured differently from the feature sets shown in FIGS. 31 and 32. For instance, a feature identified in FIGS. 31 and 32 may be absent from the SSPS 110 and one embodiment. Alternatively, or additionally, a feature identified in FIGS. 31 and 32 may be modified. It is to be further understood that the SSPS 110 is not limited to the feature set shown in FIGS. 31 and 32. Additional features may be incorporated into the SSPS 110.

Figure 4:
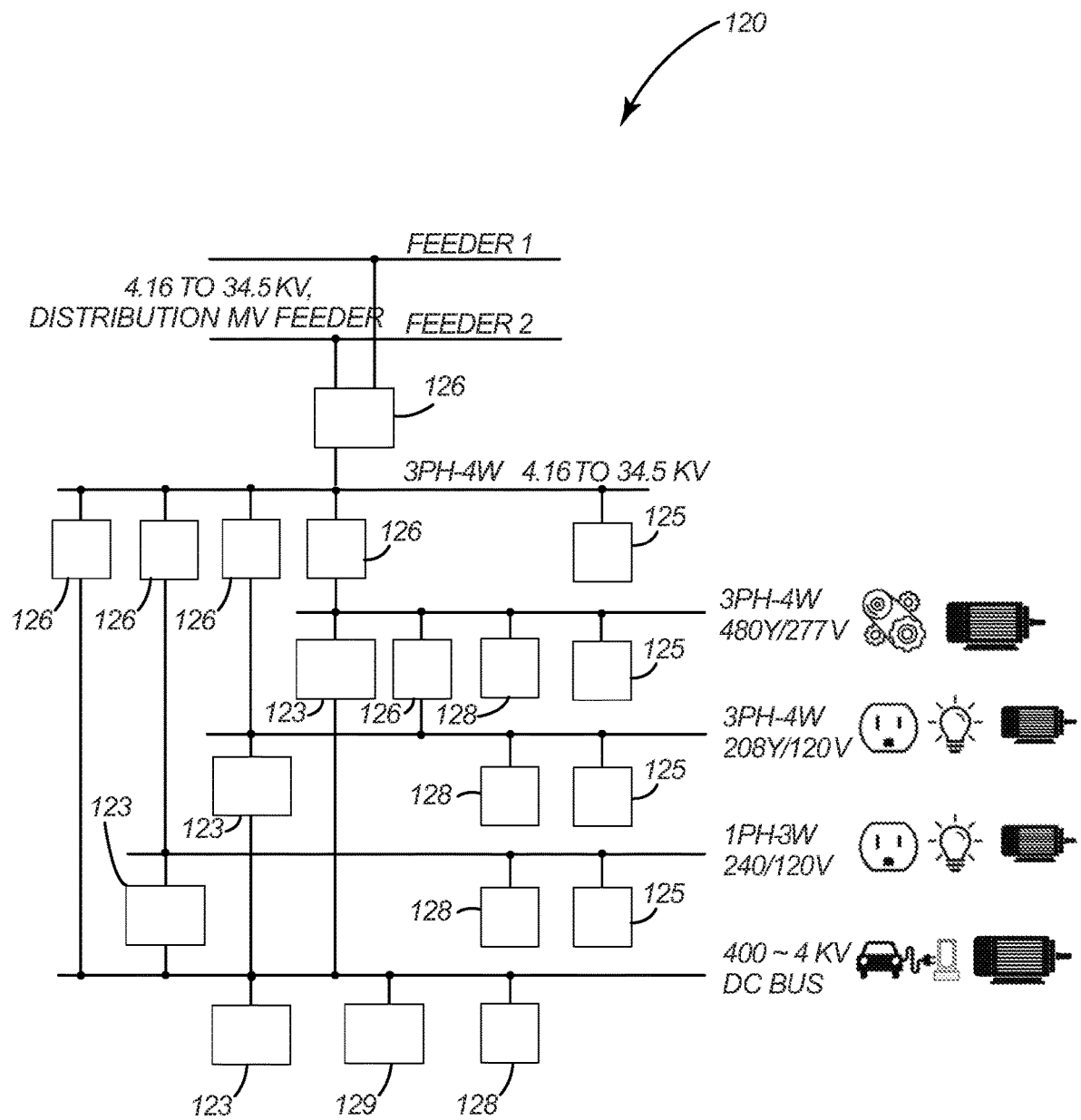
FIG. 4 shows a general template for a node in accordance with one embodiment.
Figure 22:
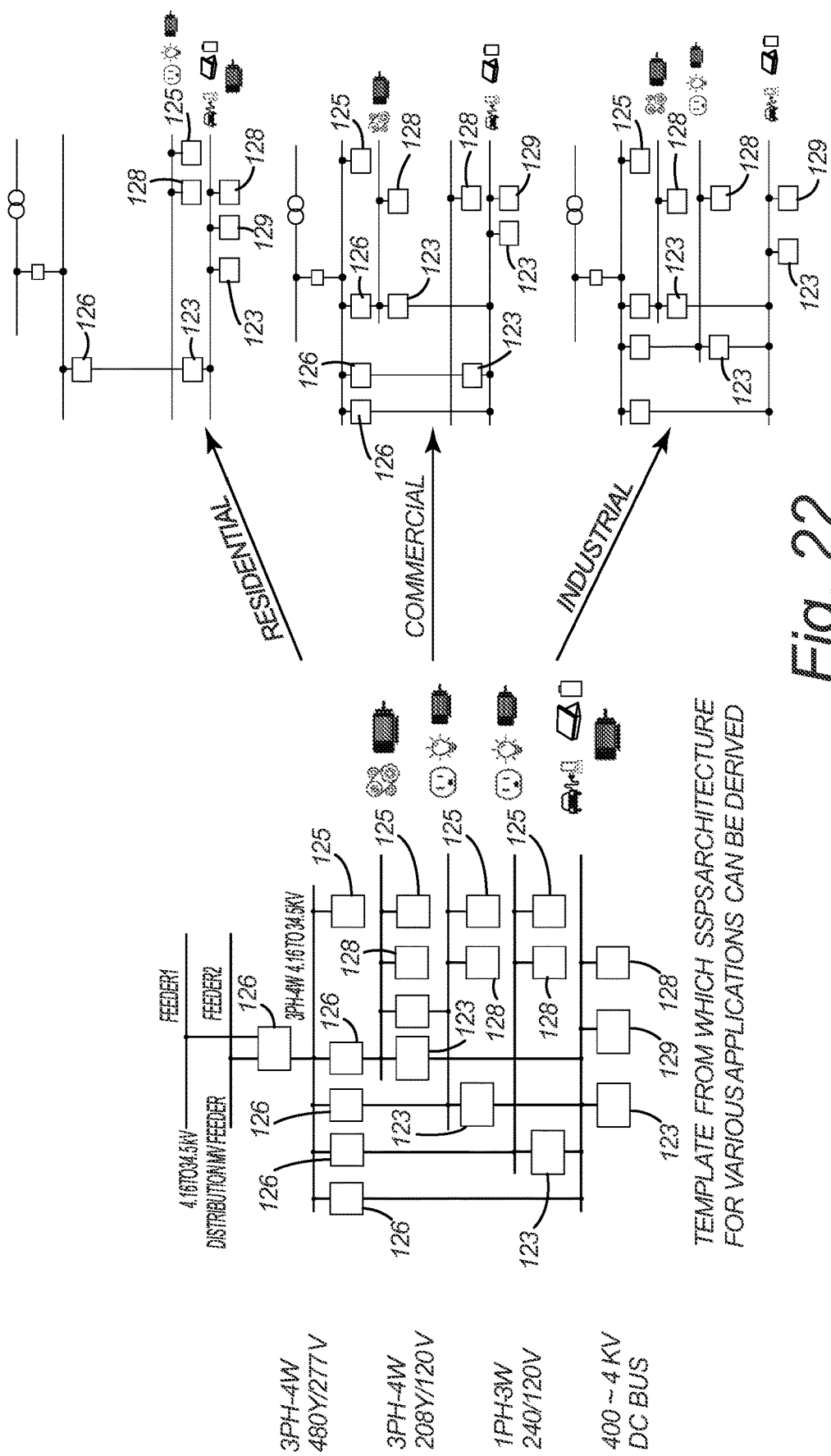
FIG. 22 shows the template of FIG. 4 being adapted according to a variety of embodiments.
Figure 23:
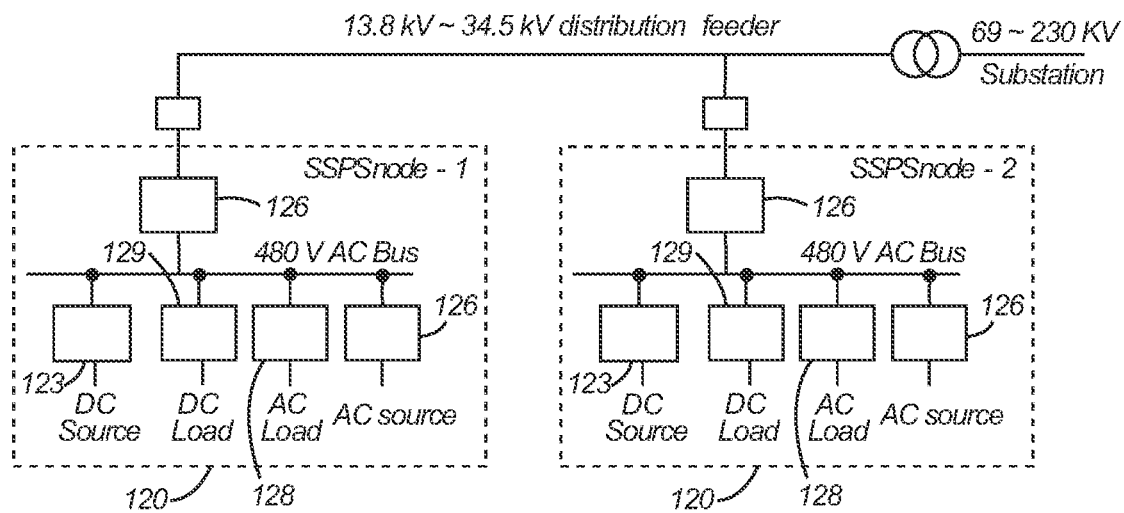
FIG. 23 shows a plurality of nodes of the system in accordance with one embodiment.
Figure 24:
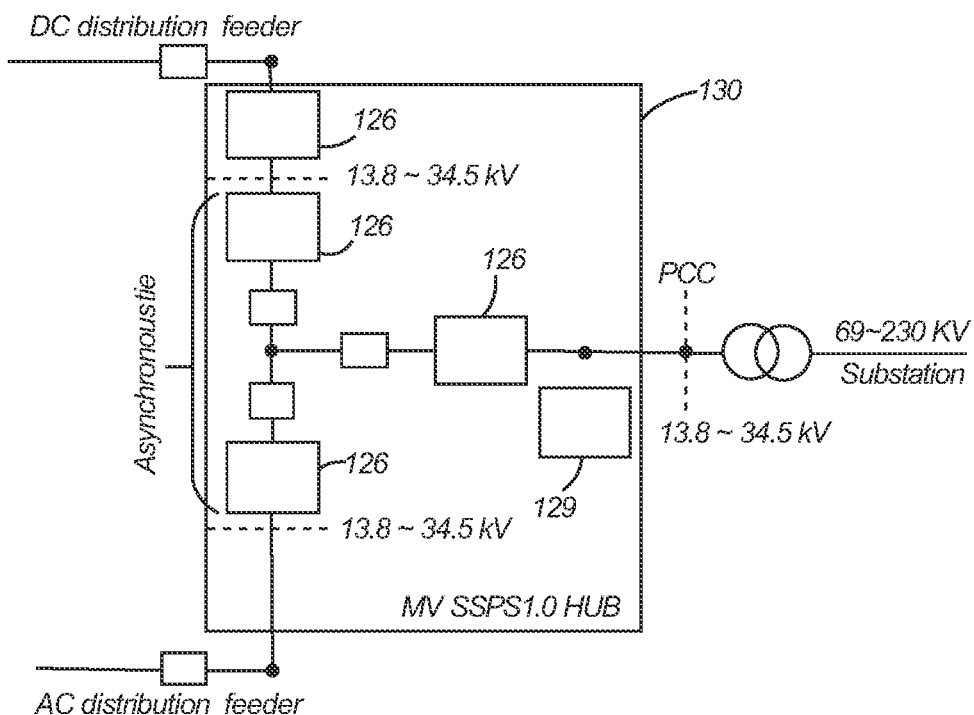
FIG. 24 shows a hub of the system in accordance with one embodiment.
Figure 25:
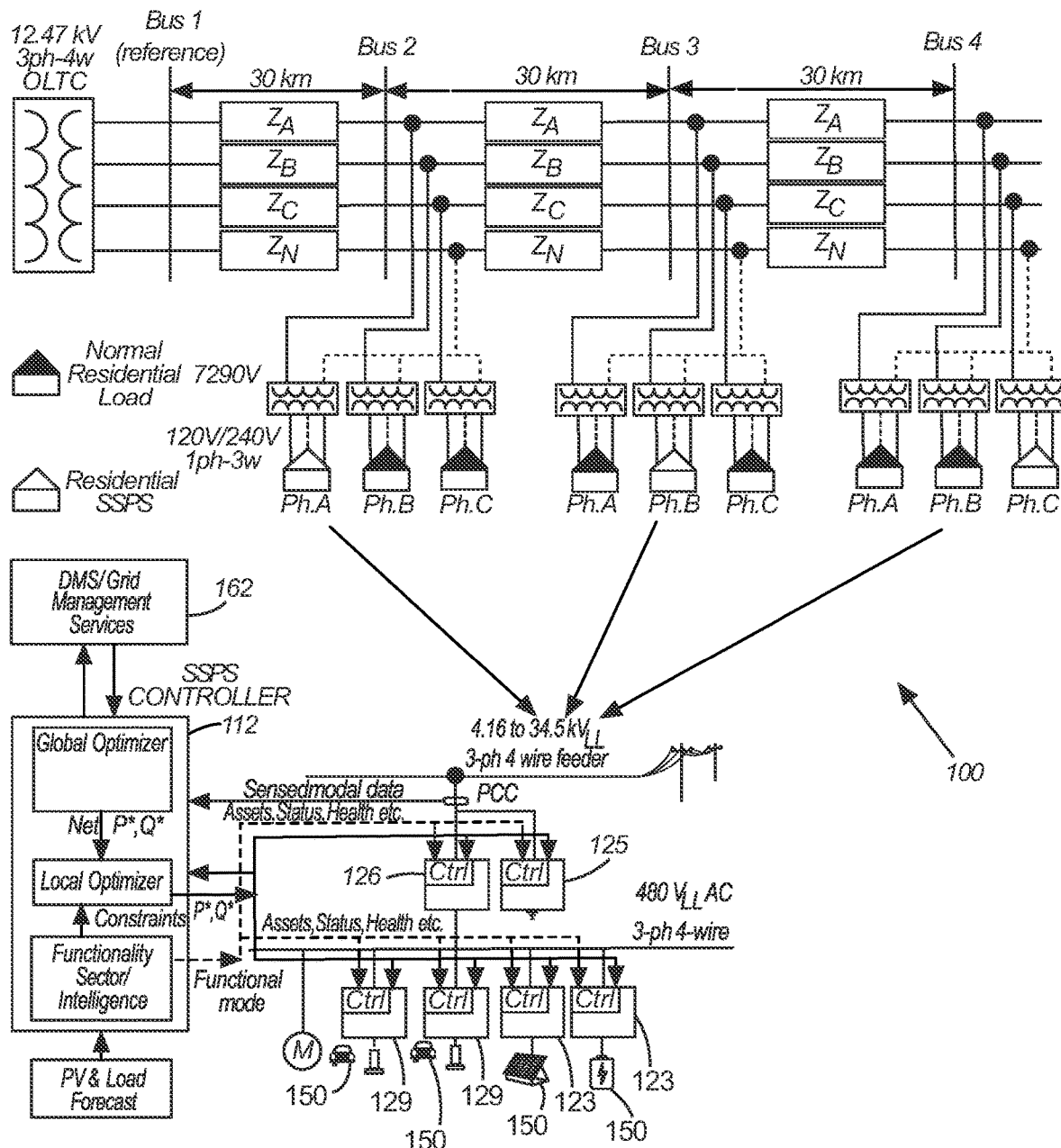
FIG. 25 shows a system in accordance with one embodiment.

Node: Node level layers or node 120 may include a cluster of building blocks termed as smart universal power electronics regulators (SUPERs) 140 tied together to a single point of connection to one feeder. A node architecture template that can be extended to a variety of distribution scale applications is shown in FIGS. 4 and 22, including applications such as residential, commercial, and industrial. Several types of SUPERs 140 are depicted in FIG. 4 in accordance with a plurality of converter classes: AC source interface (ACSI) 126, DC source interface (DCSI) 123, grid interface (GI) 125, AC load interface (ACLI) 128, and DC load interface (DCLI) 129. These converter classes can be configured as follows:

| Type: | Description: |
|---|---|
| DCSI/ACSI | Used for interfacing DC or AC sources in a system. Used for functions like power flow, frequency regulation, black start and voltage translation. Can be a low frequency or hybrid transformer in case of ACSI. |
| DCLI/ACLI | Designed to support load functions like power flow control and load transient management in case of EV etc. |
| GI | Grid-tied converters used for functions like active harmionic filtering, reactive power compensation, etc. |

As depicted in the illustrated embodiments, the node level layer may include a node controller 122.

In one embodiment, a node 120 may be defined as an electrical network that contains SUPERs 140 interconnected to a single point of connection. The node controller 122 may coordinate the SUPERs 140 to inject net real and reactive power to the point of common coupling (PCC) and to perform other local supporting functions within the node 120 (such as improved resiliency control options offered by droop type controls.) This type of system can be represented in the form of a microgrid or nano-grid, such as the one depicted in the template of FIG. 4.

It is noted that the template of FIG. 4 may be adapted for a wide variety of applications. Example of such applications are depicted in FIG. 22 for residential, commercial, and industrial settings. In the illustrated embodiment of FIG. 22, of variety of assets are coupled to the different configurations depending on the application (e.g., residential, commercial, or industrial).

Figure 5:
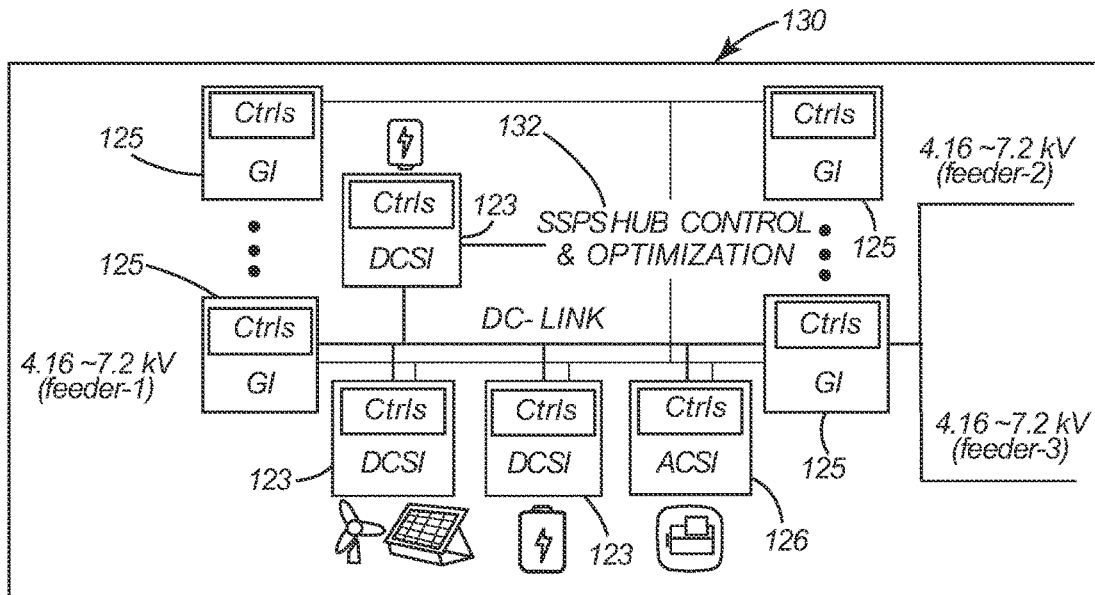
FIG. 5 shows a hub in accordance with one embodiment.

Hub: A hub level layer or hub 130 may include a cluster of power electronic interfaces (i.e., SUPERs 140), which tie multiple feeders together or from which multiple feeders emanate as shown in FIG. 5. Note that both the node and the hub may be presented as a single transactive node to the upstream grid and can be coordinated and controlled to demonstrate grid sectionalization. The hub level layer may include a hub controller 132.

In one embodiment, a hub 130 may be defined as an electrical network that includes a plurality of SUPERs 140, which interconnect multiple feeders. A hub controller 132 may coordinate the SUPERs 140 to control power flow through the hub 130 and to support voltage along the feeder. The hub controller 132 (or a node 120) may also be responsible for ensuring stability of the converter network within the hub 130. A hub 130 can be used to interconnect two systems with different frequencies and voltages, such as the hub architecture depicted in the illustrated embodiment of FIG. 5.

SUPER: A SUPER level or SUPER 140 may be a primary building block of the nodes 120 and the hubs 130. As discussed herein, a SUPER 140 may be a power conversion entity or PEC with integrated control, protection, communication, and embedded intelligence and decision-making capability. The SUPER 140 may include one or more entities described herein as intelligent power stages (IPSs). An arrangement of a plurality of SUPERs 140, some of which may be configured differently from each other, may provide a common framework for different voltage levels, futuristic loads and sources, and central controller integration. The power requirements for a particular application (e.g., an asset 150) can be met by connecting the SUPERs in series or parallel.

III. Nodes and Hubs

Nodes 120 and hubs 130 may provide the backbone of the SSPS architecture and the two can be differentiated based on the power layout and the feeder configuration. That is, the nodes 120 and the hubs 130 can be differentiated based on the number of incoming or outgoing feeders and the point of connection. At the grid edge and at the substation level, nodes 120 and hubs 130 can be linked to form regions that can be coordinated to improve grid resiliency, reliability, power quality and security. As a result, nodes 120 and hubs 130 can be defined as autonomous, intelligent grid-entities capable of power and information exchange and serve as an interface between the grid and the end user. By coordinating multiple downstream SUPERs 140, the nodes 120 and hubs 130 can facilitate realization of various grid functions, including voltage regulation, frequency regulation, phase balancing, and harmonic filtering simultaneously without compromising on the load requirements at the consumer end.

The SUPERs 140 and IPSs, designated by reference number 146 herein, are modular and scalable building blocks configured to provide different pre-defined functionalities. These fundamental building blocks allow the distribution and segregation of the controls, protection, and intelligence at various levels of the hierarchy ensuring fast decision-making capability and response to transient or abnormal conditions. Additionally, the fundamental blocks are equipped with additional features, such as cyber-physical security, health monitoring to facilitate resilient, and reliable grid tied systems.

Nodes 120 and hubs 130 may be multiport systems built with SUPERs (e.g., multiple source and load interfaces). This consolidation may increase the grid security by minimizing or reducing the number of power electronics (PE) interfaces in the grid, reduce the number of transactive systems for utility management systems (and therefore reduce computational capability), enable segregation of grid functions, and provide parallel execution of multiple grid functions. As shown in FIG. 4, each SUPERs 140 can be classified according to one of a plurality of converter classifications. The present disclosure is not limited to any particular converter classification. In one embodiment, the plurality of converter classifications may include one or more of the following: ACSI 126, DCSI 123, GI 125, ACLI 128, and DCLI 129.

The DCSI 123 and the ACSI 126 may be used for interfacing respective DC or AC sources in a system. For example, the DCSI 123 and the ACSI 126 may be configured to control power flow, frequency regulation, black start, and voltage translation. The ACSI 126 may also include a hybrid transformer. As another example, an ACSI 126 or DCSI 123 converter coupled to an energy storage system (ES) may be configured for power flow control battery state of charge control, or charge/discharge rate control, or a combination thereof.

The DCLI 129 and the ACLI 128 may be configured to support load functions, such as power flow control and load transient management in the case of a load (e.g., an asset 150) in the form of an electric vehicle. The ACLI 128 or DCLI 129 converter configuration vary based on the asset 150 or type of asset coupled to the converter. For instance, a load facing converter coupled to an electric vehicle (EV) may be configured to generate maximum power point tracking or power rate control (ramp rate), or a combination thereof.

The GI 125 provided is a grid tied converter operable for active harmonic filtering or reactive power compensation, or both. The GI 125 configuration may vary depending on the application and may provide harmonic filtering or reactive power injection.

As described herein, the SUPERs 140 may be configured according to one or more converter classes defined within the system 100. The converter classes may be used interchangeably to the extent such changes are software-based and do not require physical changes to a SUPER 140. For instance, a load-facing converter may be reconfigured as a grid tied converter based on software changes only in one embodiment. A matrix of fundamental blocks, such as the SUPERs 140 may be used to design a variety of power distribution topologies, including asynchronous ties, interties, and HVDC links.

IV. Control Architecture

Figure 11:
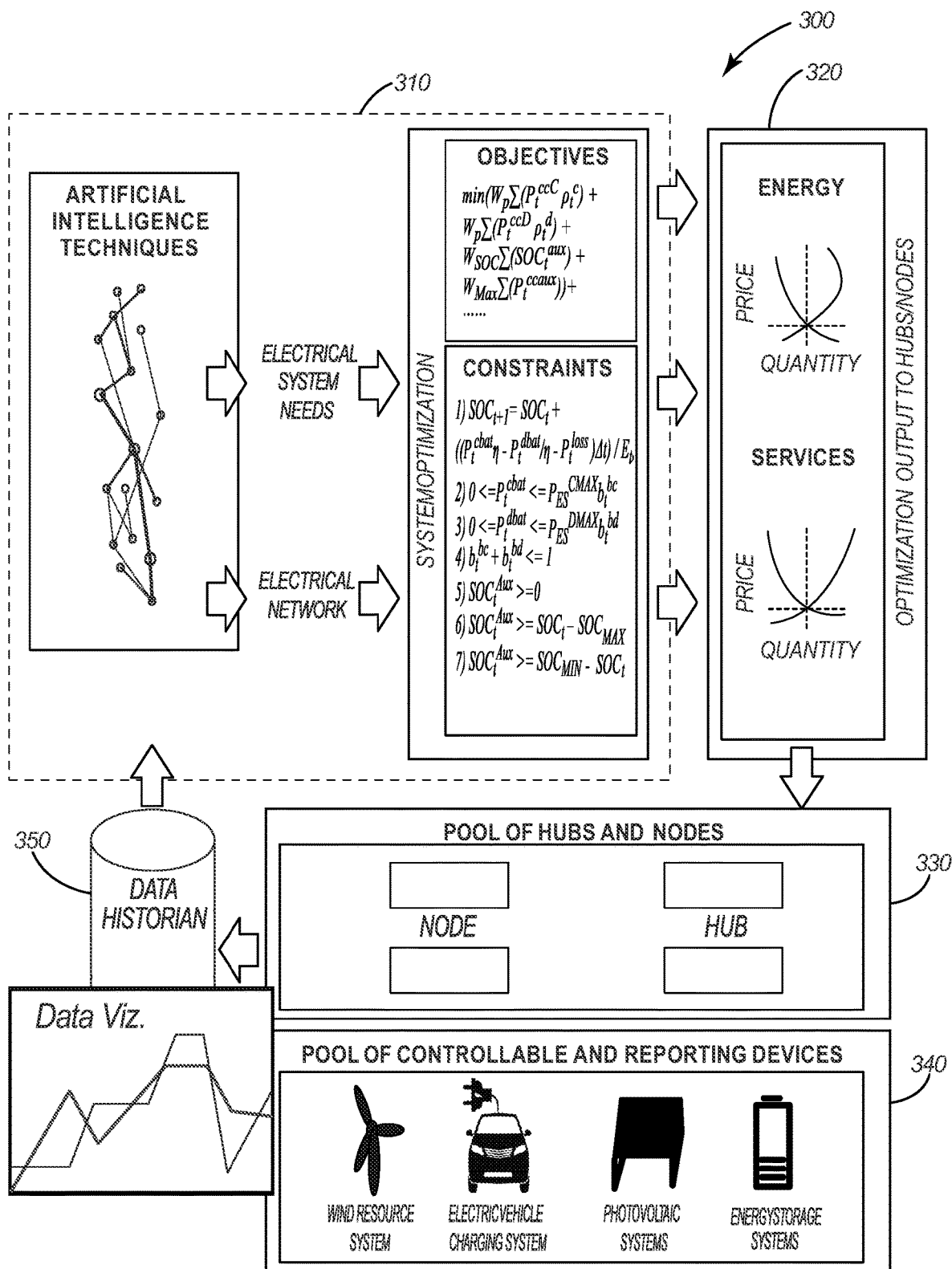
FIG. 11 shows an SSPS controller framework of the system in accordance with one embodiment.

The SSPS 110 may be represented as a set of systems and the feeders that are connected to a transmission substation 160. To control and coordinate these downstream systems the SSPS controller 112 may be configured in accordance with the controller 300 depicted in the illustrated embodiment of FIG. 11. The controller 300 can either reside in the cloud or push needed calculations (or services) to the cloud such as artificial intelligence (AI) and optimization. The controller 300 may be configured to determine an amount of additional grid services required and energy based on forecasts. The information obtained from the electrical network (e.g., the components of an SSPS 110) may be sufficient to train and operate a machine learned algorithm (e.g., utilization of AI techniques) to learn and tune forecasts and identify system needs. Based on available data, considering the electrical network and electrical system needs, a transactive market for hubs 130, nodes 120, and SUPERs 140 (including those not already residing in a hub 130 or a node 120) may be provided for the SSPS 110. The SSPS 110 or components thereof (e.g., hubs 130, nodes 120, and SUPERs 140) may bid and provide services and energy beyond a point of interconnection. Market clearing on needs may be used to establish the target objectives of the hubs 130, nodes 120, and SUPERs 140 for different time intervals. This information may be shared with the utility DMS controller 162 to be aggregated with information obtained from multiple SSPSs 110.

The controller 300 in the illustrated embodiment includes a database 350 operable to store information obtained from components of the SSPS 110, such as the node 120, the hub 130, and devices not attached to a hub 130 or node 120. The nodes 120 and the hubs 130 may be grouped together as a node/hub pool 330, and the device is not attached to a hub 130 or a node 120 and may be grouped as an unattached pool 340. Information from these two pools may be stored separately in the database 350.

The controller 300 may include a processor 310 operable to analyze information obtained from the database 350 and determine objectives and constraints with respect to the components of the SPS 110. The objectives and constraints may be provided from the processor 310 to an optimization processor 320 (which may be integral to the processor 310 or separate therefrom as depicted). The optimization processor may determine price and quantity information with respect to energy and services. This information may be communicated to components of the node/hub pool 330 and devices of the unattached pool 340.

The SSPS 110 may be represented as a set of systems in the feeders that are connected to a substation 160. Control and coordination of these downstream systems via an SSPS controller 112 may be implemented as a controller 300 described herein. The SSPS controller 112 may either reside in the cloud or push needed calculations (or services) to the cloud such as artificial intelligence (AI) and optimization. The SSPS controller 112 may determine the amount of additional grid services that may be required, and amount of energy based on forecasts. Based on available data, considering the electrical network and electrical system needs, a transactive market for hubs 130, nodes 120, and SUPERs 140 (in the unattached pool 340 or not already residing in a hub 130 or node 120) may be available. This may provide an opportunity for the hubs 130, nodes 120, and SUPERs 140 in the unattached pool 340 to bid and provide services and energy beyond the point of interconnection. Market clearing on needs may establish the target objectives of the hubs 130, nodes 120, and SUPERs 140 for different time intervals. This information may be shared with a DMS controller 162 to be aggregated with other SSPSs 110.

A multi-level architecture in accordance with one embodiment may facilitate preserving customer privacy, being less dependent on a central system, and provide relatively high plug-and-play capability. Even within such a multi-level architecture, different distributed communication can be utilized, such as those that use a coordinator, or without a coordinator, a ring connection, or random connections.

Optimization of nodes 120 or hubs 130, or a component thereof, within the electric grid may be achieved in a variety of ways in accordance with one or more embodiments described herein. Optimization may be implemented by a respective node controller 122 or a hub controller 132. The optimization approach may target design improvements, improved operational efficiency, and energy management and voltage control in electrical networks. However, the present disclosure is not limited to such optimization approaches. The SSPS 110, node 120, or hub 130 can do more than pure energy and voltage supporting systems for the electric grid. Operational capabilities of an SSPS 110, node 120, or hub 130, or a component thereof, may include the ability to detect and transition electrical networks to islanded networks due to electric grid challenges, provide harmonic attenuation and power quality improvement, coordinate load sharing and formation, and support multiple levels of system protection to name a few. These are operating capabilities of the SSPS 110, node 120, or hub 130 that are provided in both normal and abnormal operating conditions automatically at potentially the cost of not meeting optimized targets. In one embodiment, the amount of capability a resource is to provide at any given instance may be determined based on an established setting instrumented into the SSPS 110, node 120, or hub 130, or a component thereof deployment and not based on current operating conditions within the electric grid. However, this may hamper integration efforts by potentially falsely portraying availability or neglecting a main charge.

In one embodiment, the hub 130 or node 120 may utilize a SUPER 140 to provide advanced control capabilities and leverage machine learning models for managing operation of the SSPS 110. The hub controller 132 or node controller 122 may be operable to characterize one or more SUPERs 140 of the system and an electrical model of the system, and to direct system needs based on historical data stored in memory (e.g., database 350). Resource characteristics include accurately portraying the SUPER capability considering environmental impacts, weather forecasts, and other parameters, while direct system needs may establish the potential changes in harmonics, system impedance, system voltage and frequency based on historical trends. The node controller 122 or the hub controller 132, via machine learning models, may be operable to generate bidding strategies.

Controller coordination among components of the system 100, including the SSPS 110, the hubs 130, and the nodes 120 may be achieved in a variety of ways, including mixed integer linear programming or other techniques. The mixed integer linear programming may involve optimization formulation considering economics, such as cost of P and Q, allocation for reserves for dynamic conditions/operations, reserves, downstream nodes/hubs architecture, or available control modes, or a combination thereof. Other possible techniques include hybrid techniques, such as machine learning, training data set generation for different operating conditions, problem formulation based on feeder losses, and system training and testing. Training data set generation for different operating conditions may be based on variables such as grid parameters and hub/node parameters. Problem formulation based on feeder losses may also be based on placement of the nodes/hubs.

Optimization algorithms implemented by the SSPS controller 112 may be based on swarm intelligence, evolutionary algorithms, neural networks, fuzzy logic, or deterministic, stochastic, or robust methods, or any combination thereof. The optimization may be multi-objective and may consider accepted bids, a need to reduce power quality issues, capture poor forecasting challenges, and other system factors. The output of the optimization algorithm may be a set of prioritized control modes, thresholds, and operating setpoints for a SUPER 140 or a multiple SUPERs 140.

Figure 13:
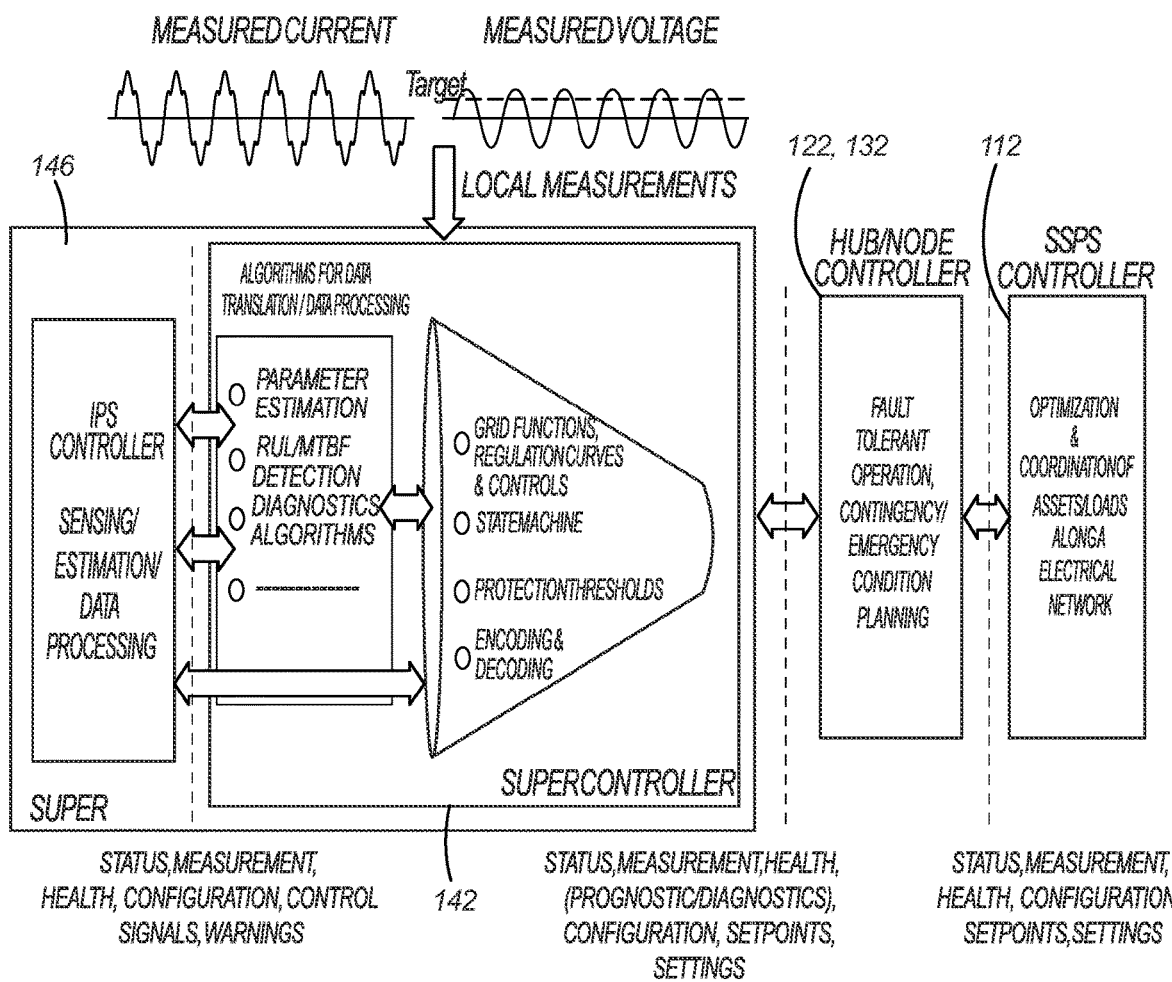
FIG. 13 shows a system configuration in accordance with one embodiment.

As discussed herein in conjunction with one or more embodiments, the SUPER architecture may include multiple levels of controls and decision making, which can be coordinated with the hub controller 132 or the node controller 122. The hub controller 132 or the node controller 122 may distribute a set of control modes and priorities to SUPERs 140 such that fast communication between the hub controller 132 or the node controller 122 and SUPERs 140 may not be required. Instead, for example, only local measurements and nearby devices requiring support may drive the control decisions within the SUPER 140. The SUPER controller 142, as described herein and shown in FIG. 13, may be configured to prioritize harmonic injection or any grid function, dynamic voltage and frequency support, and nearby device support. Local measurements obtained by the SUPER controller 142 may indicate that harmonics and voltage challenges are beyond thresholds and are targeted for immediate control actions from the SUPER 140. Thus, the SUPER controller 142 may host control algorithms for the SUPER 140, including voltage and current control, PLL, and balancing control. The SUPER 140 may be configured to coordinate the system based on the health of IPSs 146 or the stress levels of the IPS 146.

Figure 14:
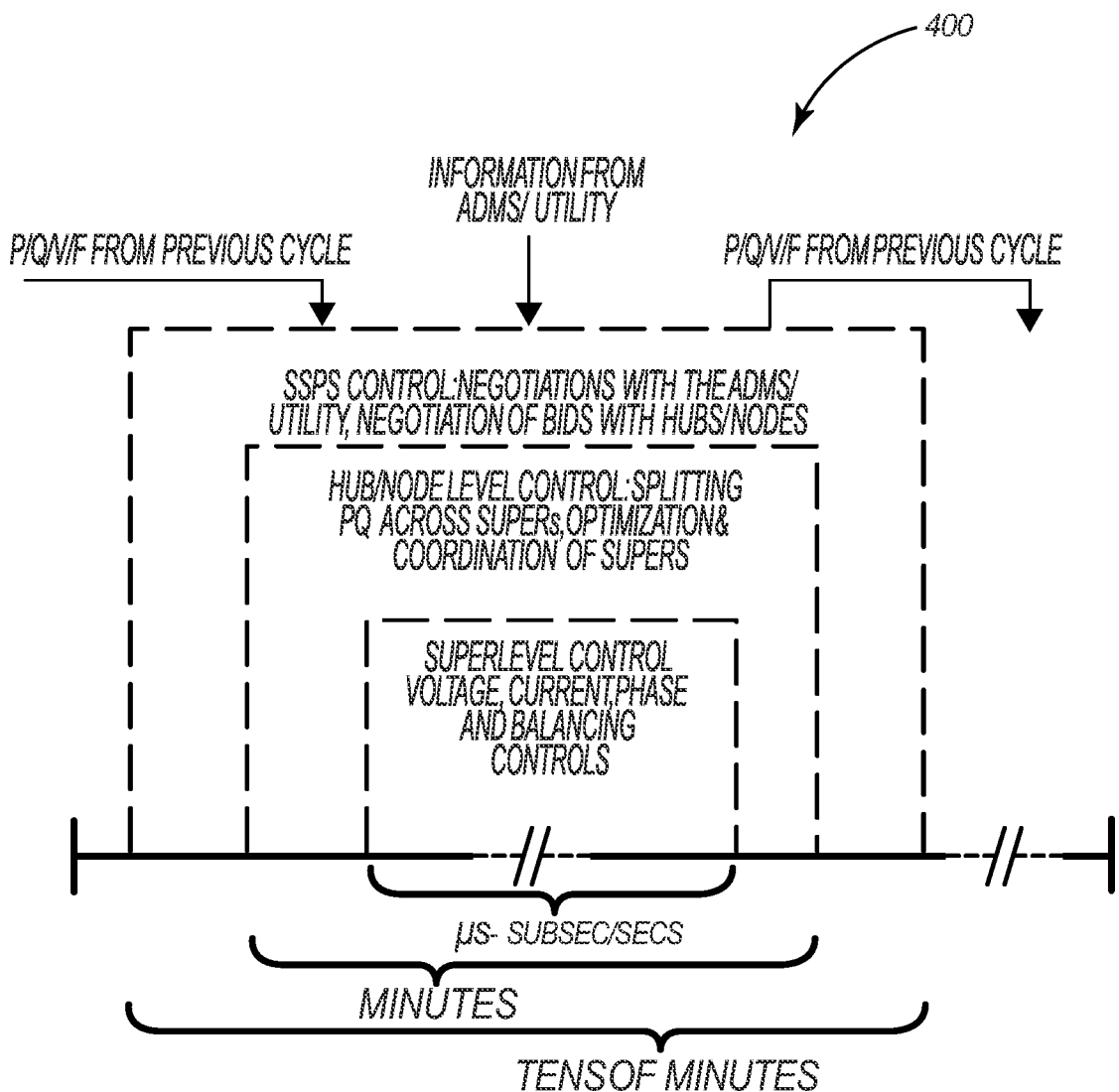
FIG. 14 shows a timing diagram for controls in accordance with one embodiment.

The three levels of controls (e.g., SSPS control, hub control/node control node and SUPER control) may utilize timing requirements to keep the system responsive to both abnormal and normal grid conditions. The identified timing requirements for the three layers in accordance with one embodiment is shown in FIG. 14. The SUPER controller 142 may utilize a response time in the range of $\mu s$ to ms based on the current and voltage control loop bandwidths. The SUPER controller 142, within this control loop, may direct of the SUPER 140 to control one or more of voltage, current, phase, and balancing.

In the illustrated embodiment, the hub controller 132/node controller 122 may coordinate with the SUPER controller 142 in the order of minutes based on the changes in the grid or system conditions. The hub controller 132 and/or the node controller 122, within this control loop, may control splitting of reactive and apparent power and grid functions across multiple SUPERs 140 and communicate directives to optimize or enhance operation and coordination of the SUPERs 140.

The SSPS controller 112 may communicate with the hub controller 132 or the node controller 122 in the order of tens of minutes for transactive control. Within this control loop, the SSPS controller 112 may negotiate with the DMS 162 and negotiate bids with the hub controller 132 and/or the node controller 122.

Figure 9:
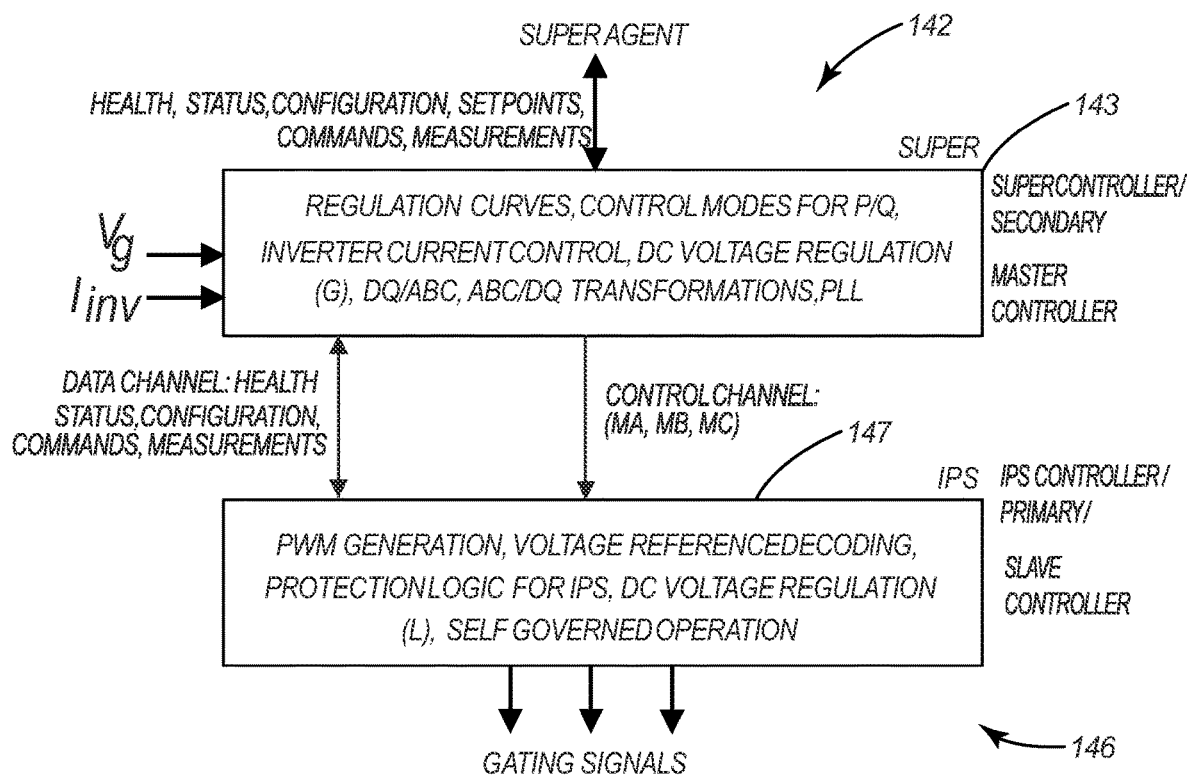
FIG. 9 depicts data and control channels between an IPS and a SUPER and segregation of functions between the IPS and the SUPER in accordance with one embodiment.
Figure 10:
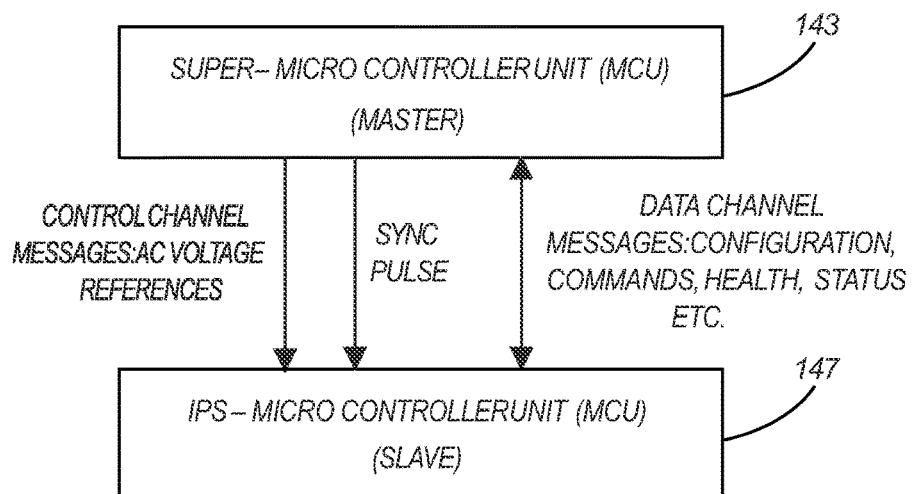
FIG. 10 shows data and control channels between the IPS and the SUPER of FIG. 9 in further detail.

The SUPER 140 may be configured to emulate a conventional power converter via one or more IPSs 146 (e.g., multiple subsystems/power stages). The SUPER controller 142 may be operable as the secondary controller while the subsystems (e.g., the IPS controllers 147) are the primary controllers. Based on the type of interface, the SUPER controller 142 may host regulation curves, the PLL, and the outer and the inner control loops. The SUPER 140 may generate AC voltage references (for 1-ph/3-ph DC/AC configurations) or the duty cycles (for DC/DC configurations). The reference or duty cycles, or other signals generated by the SUPER 140, may be relayed through a communication channel (optionally a dedicated communication channel) to the IPSs 146. The IPSs 146 may be equipped with PWM generators to generate gating signals based on the values received from SUPER 140 as shown in FIGS. 9 and 10. The IPSs 146 may host control algorithms to handle events, such as loss of communication with the SUPER controller 142.

The transmission of the control signals between the SUPER controller 142 and the IPS controller 147 may be periodic and dependent on the switching frequency of the SUPER 140. The communication link may be an integral part of the control loop of the SUPER 140, and so the quantization and resolution of the control signals through the channel may impact the total harmonic distortion (THD) of the grid/output current. This may be factored into the communication protocol. Additionally, the data transmission time may be a delay in the control loop, and this may be reduced or kept as low as possible (e.g., less than a switching cycle) to enhance the control bandwidth through synchronization. In case of single or multiple IPSs 146 within the SUPER 140, the SUPER 140 may coordinate the synchronization of one or more IPSs 146.

The SUPER 140 may receive setpoints/commands from a hierarchical controller or upper level controller (e.g., a node controller 122, a hub controller 132, or an SPS controller 112) at the grid node through the SUPER agent of the SUPER controller 142. The upper level controller may correspond to the next level of the control hierarchy in the node 120, hub 130, or SSPS 110 with respect to the SUPER 140. The upper level controller may determine the system level objectives, including optimization algorithms for economic operation and various functions, such as voltage and frequency regulation. The upper level controller may be responsible for negotiations with the DMS 162 or other utility level controller. Based on negotiations (direct or indirect) with a further upper level controller (e.g., a DMS 162) and the system configuration, the upper level controller may estimate the P, Q setpoints (i.e., apparent and reactive power setpoints) for the various converters (e.g., SUPERs 140) in the system under normal conditions. The SUPER agent of a SUPER 140 may receive communications from the upper level controller and operate based on the information received in the communication. For instance, the communications may include the P, Q setpoints, and the SUPER 140 may translate the setpoints, regulation curves, and control modes for operation. The timeline of operation of the SUPER 140 and the upper level controller may be based on time constraints such as those described in conjunction with FIG. 14. In the event of abnormalities at the POC or the PCC, the SUPER controller 142 can autonomously respond to the abnormalities based on the preset regulation curves without waiting for a command from the DMS 162, the frequency of which is around 10~15 minutes, or from one or more of the node controller 122, the hub controller 132, or the SSPS controller 110.

Dynamic grid support algorithms can also be provided in SUPER 140 or the preset regulation curves in the SUPER 140 can be changed through the agent framework (e.g., communications between the SUPER controller 142 and an upper level controller).

Figure 6:
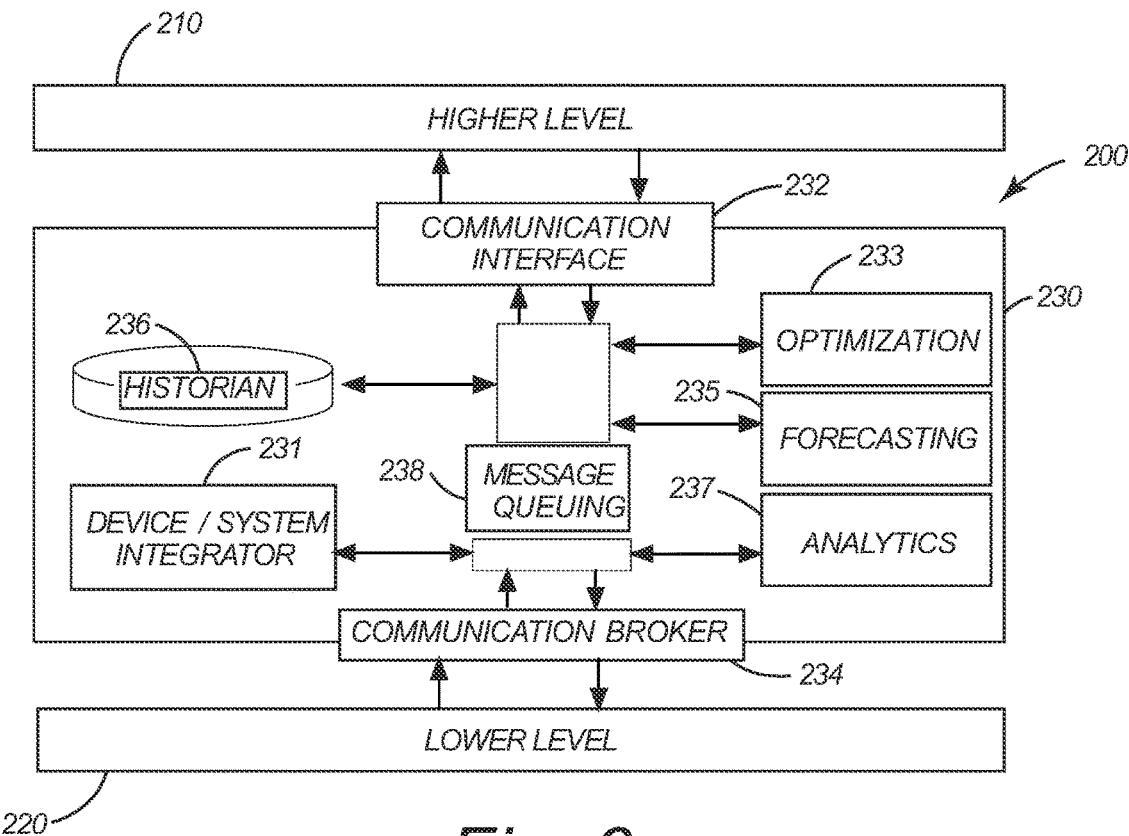
FIG. 6 shows a hierarchical controller architecture for the system of FIG. 1A in accordance with one embodiment.

The SSPS controller 112, the node controller 122, and the hub controller 132 may all be developed considering a base set of features. These features or components may include data capture in a historian, and data evaluation using various levels of analytics (which could include artificial intelligence), communication interfaces, forecasting, and optimization. A depiction of a controller architecture as utilized in this work is shown in the illustrated embodiment of FIG. 6, and is designated 200. A controller 230 of the controller architecture 200 may include first and second communication interfaces 232, 234 operable to respectively communicate to a higher level controller 210 or a lower level controller 220. The controller 200 may include a database or historian 236 and a message queuing system 238 operable to receive and direct communications generated by a system integrator 231, and optimization engine 233, a forecasting engine 235, and an analytic engine 237, or any combination thereof.

Each of these components may be launched via a central set of code that creates operational threads that operate the respective features in parallel. The threads may interact through the message queuing system 238 (get and set commands to a que) to ensure operational decisions are using the most recent sets of data. The controller 230 may be provided as an integrated aspect of a component described herein (e.g., a node controller 122, a hub controller 132, or an SSPS controller 112) or provided as a system that is distributed (such as in a cloud platform).

For plug-and-play adaptability in accordance with one embodiment, a message queuing system for multiple controllers may be provided. For instance, a Message Queue Telemetry Transport (MQTT) protocol may be adopted between the controllers with a schema that supports registration of SUPERs 140 and sub-systems via a device/system integrator engine 231. This registration process may be conducted autonomously by configuring a specified internet protocol address of the higher-level systems and importing this address into the sub-system or SUPER controller 142. The historian 236 may collect all communicated data external to the controller 230 and developed system data from analytics, optimization, and forecasting. This may be configured in an SQLite structure for reporting.

In one embodiment, a multiagent system (MAS) may be used to embed intelligence in the system 100, such that a MAS is extended to the SSPS 110 to embed the computational aspects starting from the fundamental building blocks. The MAS architecture may be used for interactions between the different entities (e.g., SUPERs 140, nodes 120, and hubs 130) that have local decision-making capabilities and systems that progressively utilize the addition of new functionalities.

In addition to the MAS, real-time load and source optimization with price negotiation optimization of the assets in the SSPS 110 may be used to realize multiple combinations of grid functions without substantially compromising the load requirements.

In the illustrating embodiment of FIG. 4, a system 100 including a plurality of SSPSs 110 is shown coupled via a feeder to a substation 160 and communicatively coupled to a DMS controller 162. The control system may actively monitor the PCC or POC for voltage, frequency deviations, and other abnormalities. Monitoring may be achieved at any level in the hierarchical system, including at the hub level, node level, or SUPER level. Based on information obtained at one or more of these levels, control systems or controllers of the system 100 may act to address issues, such as frequency deviations or other abnormalities. Through coordinated control, the system 100 may regulate voltage and frequency deviations along the feeder in the illustrated embodiment in a timeframe less than 10 minutes. Host functions provided in controllers at different system layers may demand response locally to provide more flexibility and even faster response times.

V. Protection Architecture

Like hierarchical control, hierarchical protection may enable resilient and reliable operation of the power distribution system 100. The hierarchal protection configuration of the system 100 is described primarily in conjunction with internal protection of the systems and subsystems (e.g., the nodes 120, the hubs 130, and the SUPERs 140). However, it is to be understood that the present disclosure is not so limited, and that aspects of the protection configuration may be implemented in the SSPS 110.

The hub controller 132 and/or the node controller 132 may coordinate with the SUPERs 140 and their connection to the grid at the point of connection (POC). Therefore, the hub controller 132 and/or the node controller 122 may provide protection constraints, thresholds, and a finite state machine (FSM) to facilitate functionality, such as initial system startup, back start, grid forming and islanding, and system reconfiguration in the event of loss of one or multiple SUPERs 140 (e.g., fault tolerant operation). These protection thresholds and constraints may be part of the optimization algorithm for the hub 130/node 120 that outputs control setpoints to the SUPERs 140. The hub controller 132 and/or the node controller 122 may also manage or coordinate protection circuitry within the hub 130 and/or the node 120 that include breakers and a grid disconnect switch in an effort to deal with the faults internal to the system 100.

Internally, the SUPERs 140 may respond to faults and events, such as power stage failure and loss of communication. The SUPERs 140 may also host health-based algorithms, such as active thermal control to enable resilient and reliable operation. Also, the SUPERs 140 may be equipped to auto configure and start and shutdown based on the commands from the hub controller 132 and/or the node controller 122. This type of operation may be achieved via an FSM provided in the SUPER controller 142 or FSM advanced algorithms.

Like the control architecture, the protection architecture may utilize timing requirements for reliable operation. An example set of timing requirements is depicted in the timing diagram 500 in the illustrated embodiment of FIG. 15. The SUPER controller 142 may be equipped to respond faster than the hub controller 132, node controller 122, or SSPS controller 112 to internal and external systems faults. Action by the SUPER controller 142 may be followed by the hub controller 132 and/or the node controller 122 and then the SSPS controller 112. A list of the control and protection features that can be embedded in a SUPER 140 is provided below. specifically, the SUPER controller 142 may be configured to implement one or more of the following:

| Function: | Frequency: |
|---|---|
| IEEE 1547 functions with the corresponding protection thresholds | Based on grid conditions |
| Functions for transactive control - generation of bids for assets | Based on request |
| Intelligently operate a power stage within the SUPER 140 (i.e., IPSs with loss in communication to the SUPER) | Periodic Watchdog |
| Intelligently operate the SUPER 140 with loss in communication to assets 150 (e.g., ES, wind turbine, and PV) | Periodic Watchdog |
| Operate the SUPER 140 even with loss of communication with the SSPS controller 112 | Periodic Watchdog |
| Inherent black start capability to maintain critical loads in the event of grid/catastrophic failures | With change in system operating conditions |
| Controller parameter tuning | On Startup and change in system conditions |
| Capability to realize dynamic grid functions, such as voltage and frequency regulation. For instance, the SUPER controller 142 may dynamically choose and vary a converter mode of operation depending on system conditions | Continuous |
| Anomaly detection (Cyber-attacks, fault condition etc.) | Continuous |
| Reliability e.g., lifetime-based and self-awareness control. Examples of such control include managing DER charge/discharge rates based on lifetimes, active thermal/power flow control, and prognostics | Periodic (minutes) |
| Adaptive flow rate (air) control | Changes in operating conditions (AT) |
| Respond to internal SUPER faults with least impact to the system and degrade gracefully | Periodic |
| Manage the start-up and shutdown of the SUPER 140 under normal and catastrophic conditions | On startup & shutdown |
| Hot swap capability and the associated controls for system stabilization | In frequent |
| Auto/self-configure the SUPER 140 based on the load/source attached to it and based on its protection circuitry | On Startup & change in system conditions |

The SUPERs 140 may include protection circuitry to isolate themselves and their entities in the event of an internal fault and/or based on external grid conditions. In case of grid conditions, the SUPER controller 142 may be programmed with thresholds to respond to over voltage (OV), under voltage (UV), over frequency (OF), under frequency (UF), and over current (OC) conditions at the POC. Additionally, the SUPER controllers 142 may be programmed with ride though settings as mandated by IEEE 1547. The hub controller 132 and/or the node controller 122 can reconfigure these settings of the SUPER controller 142 based on the grid conditions, system configuration, and when needed.

Figure 17:
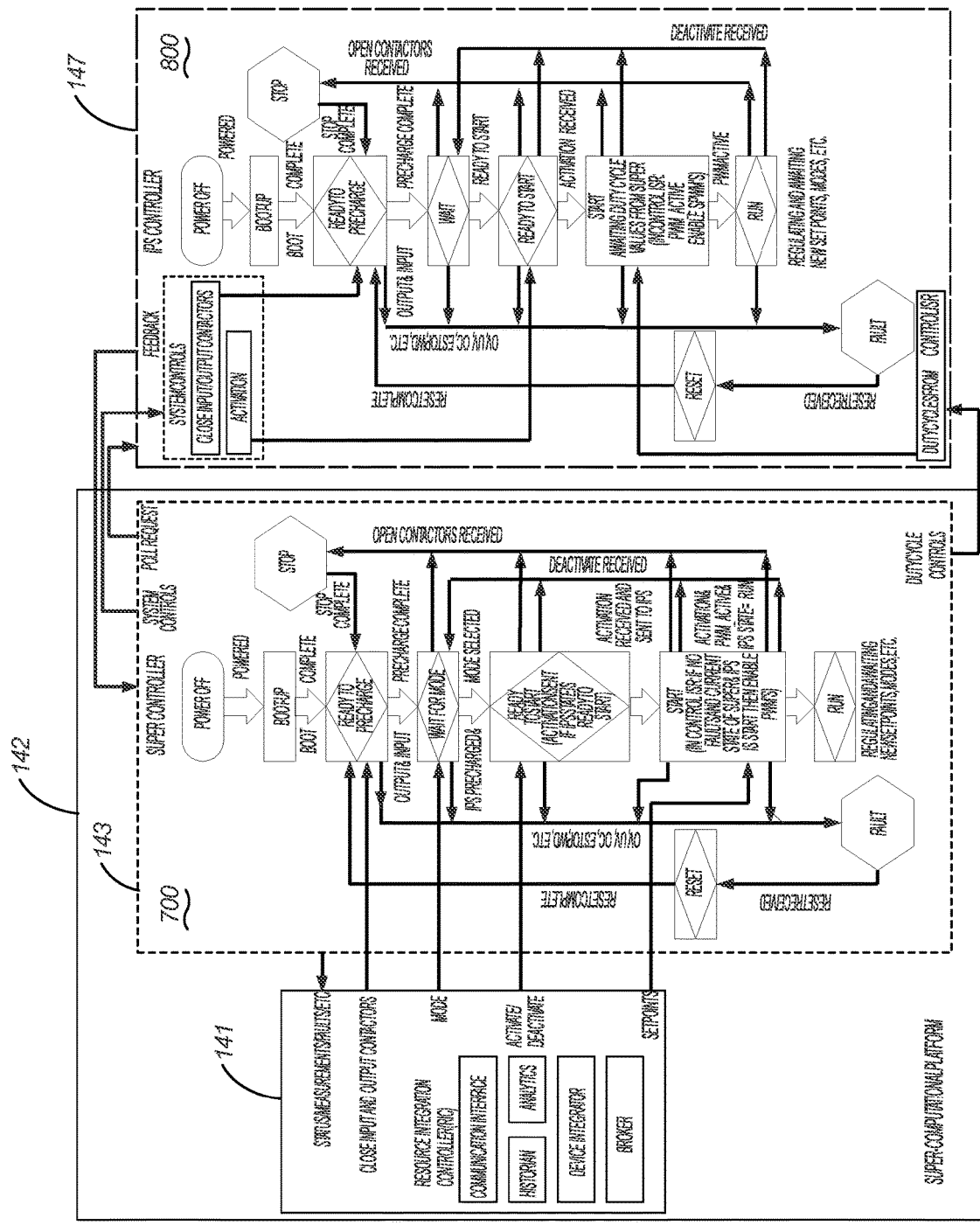
FIG. 17 shows methods of operation, including coordination between an IPS and a SUPER, in accordance with one embodiment.

Like the controls, the system protection may be hierarchical to isolate the system or the components as quickly as possible in the event of a localized fault or a failure. Thus, the IPS 146 may be configured to respond faster to faults using hybrid signals (i.e., digital and analog). The IPS 146 may disable the PWMs to the semiconductor switches in the event of over voltage (OV), over current (OC) or over temperature (OT) with respect to the power stage. The IPS 146 may be equipped with sensors for fast protection. The SUPER controller 142 may respond to abnormalities in the converter operating conditions (e.g., IPS operating conditions) and may meet the ride through requirements for grid-connected systems. Fault-tolerant operation involving reconfiguration of IPSs 146 may fall under the domain of SUPER protection. The SUPER controller 142, on the other hand, may coordinate the startup/shutdown of the SUPER 140 based on the loads or assets connected to it. The SUPER 140 may internally coordinate the startup/shutdown of the IPSs 146 internal to it. To enable such a coordination, a finite state machine (FSM) of IPS 146, SUPER 140 and the SUPER controller 142 may be coordinated through the communication links existing between them. A SUPER computational node 151 may conduct operation of the FSM, which may communicate with controller 143 via a communication interface 152. An example of such a coordination between the SUPER 140 and IPS 146 is shown in FIG. 17. Scenarios such as loss of communication, internal faults in the IPS 146 may be relayed to the SUPER controller 142 using the communication links. A watch dog may also be programmed in the SUPER controller 142 to detect loss of communication.

The upper-level controller may also enable fault-tolerant (i.e., reconfiguring the system and the grid functions when one converter i.e., SUPER 140 is faulted) operation with respect to the whole system based on the information received from the SUPERs 140 and the measured nodal voltages and currents.

A list of the control and protection features that can be embedded in a hub 130 and/or a node 120 is provided below. Specifically, the hub controller 132 and/or the node controller 122 may be configured to implement one or more of the following:

| Function: | Frequency: |
|---|---|
| Auto/self-configure the hub/node based on the load/source attached to it and based on its protection circuitry | On Startup & change in system conditions |
| Anomaly detection | Continuous |
| Intelligently operate the hub/node with loss of communication to SSPS controller | Periodic watchdog |
| Respond to internal SUPER faults with least impact to the system and degrade gracefully | Periodic |
| Manage the start-up and shutdown of the system under normal and catastrophic conditions | On startup & shutdown |

VI. Communications

Figure 15:
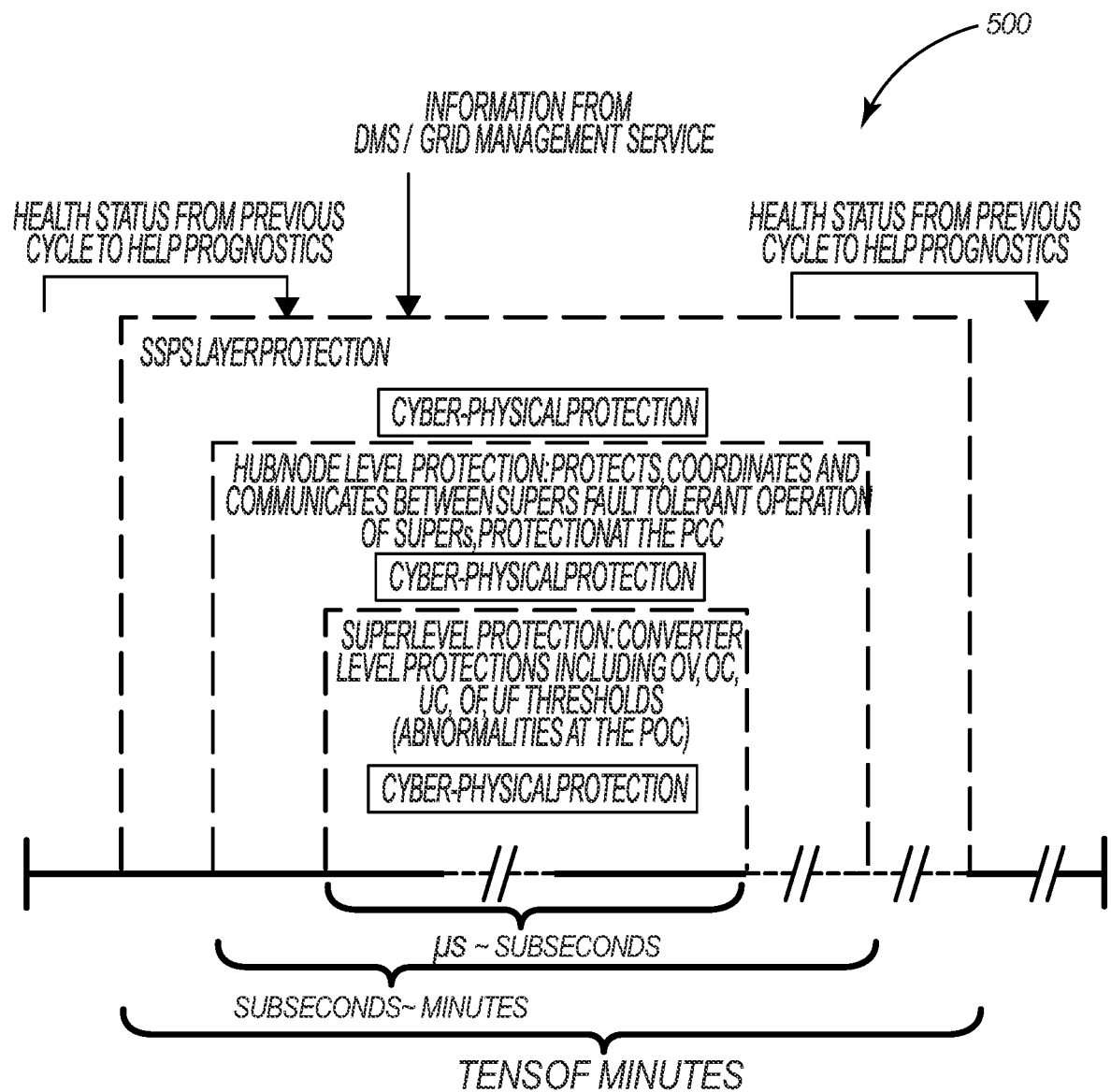
FIG. 15 shows the timing diagram for protection in accordance with one embodiment.

Communication may be used as a basis for the control and the protection hierarchy, as well as operating within the timing requirements described and shown in conjunction with FIGS. 14 and 15. The communication speed/channel capacity in bits per second (bps) may decrease from the SUPER level to the SSPS level, and the control and protection response timings may increase from the SSPS level to the SUPER level. As shown in the illustrated embodiments of FIGS. 2 and 16, message transfer in the order of sub seconds to minutes enables communication of status, health, measurements, and settings from the SUPER controller 142 to the hub controller 132 and/or node controller 122 for protection and control. The hub controller 132 and/or node controller 122, on the other hand, may receive and negotiate bids from the SSPS controller 112 and relays its status and health in the order of tens of minutes to help preserve the integrity of the architecture. The timing requirements may restrict or help decide the communication protocols that can be used on the different layers, and message prioritization. The number of messages that can be transmitted or received between the layers may also depend on the available computational capability at the various layers of the hierarchy. It is thereby helpful to streamline the health and cyber physical messages from SUPERs 140 to the SSPS 110.

Figure 16:
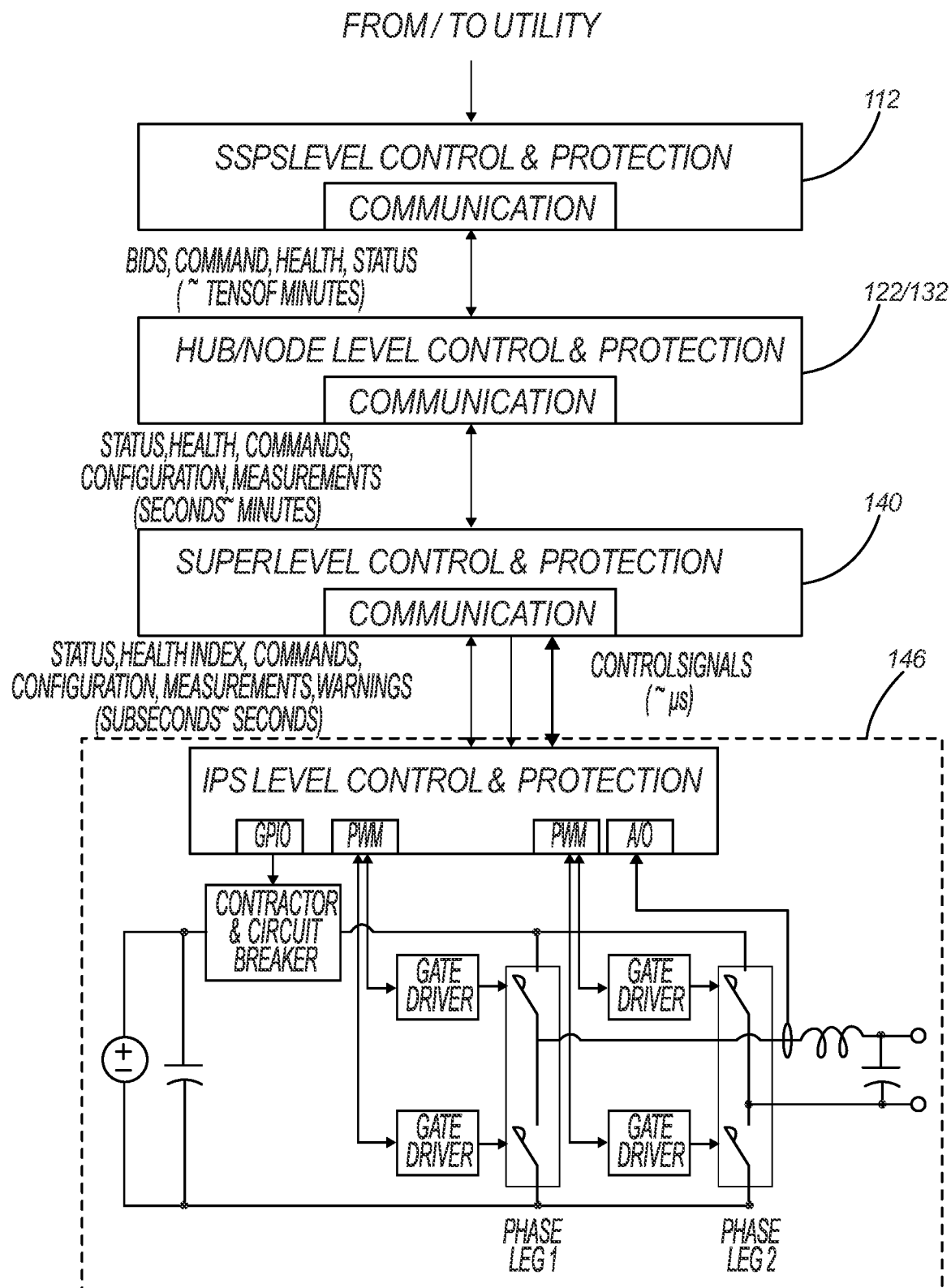
FIG. 16 depicts communications between controllers within the system in accordance with one embodiment.

Communication between the SUPER 140 and the IPS 146 and an upper-level controller may facilitate control and the protection hierarchy. The communication speed/channel capacity in bits per second (bps) decreases from IPS to higher level controllers, while the control and protection speed increases from the higher level controllers to the IPS. To meet the interoperability and scalability requirements, the SUPER 140 and IPS 146 are designed with two communication channels and a synchronization channel as shown in FIG. 16. In one embodiment, there are two channels in the SUPER 140, one dedicated for controls and other for coordination, protection. The two channels may help to preserve the control bandwidth besides allowing scalability and interoperability. Also, the control signals may be relayed at higher speed than data so this segregation enables control signals bandwidth to be maintained at a higher level and the data signal bandwidth.

It is noted that the IPS 146 in one embodiment is optional with respect to the SUPER 140. The IPS 146 in the illustrated embodiment of FIG. 16 is shown with dash lines indicating its optional status.

Figure 12:
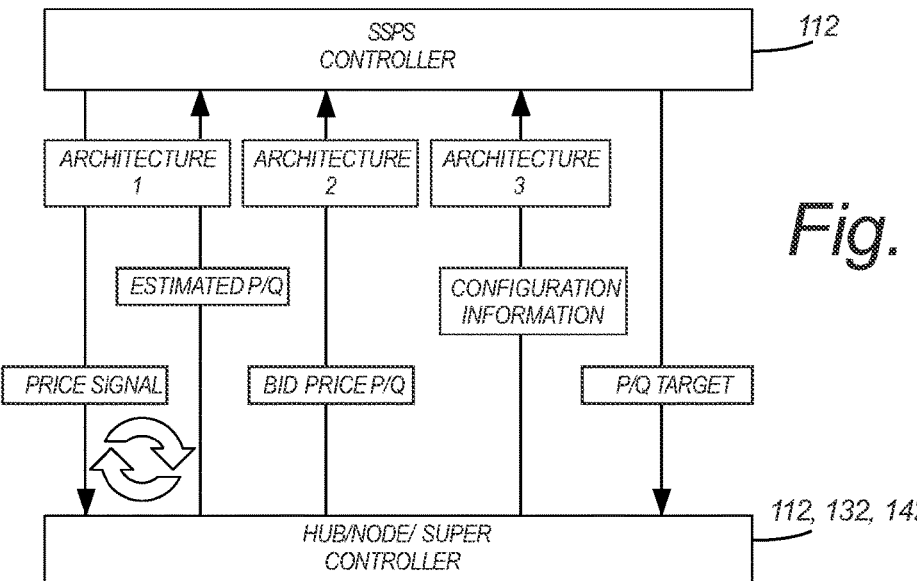
FIG. 12 shows communications between components of an architecture for an SSPS controller for nodes and hubs coordination in accordance with one embodiment.

In the illustrated embodiment of FIG. 12, the hierarchical structure of the system 100 may facilitate communications between controllers of the system 100 with respect to bidding and control over power transfer. For instance, the SSPS controller 112 may communicate a price signal to a lower level controller, such as the hub controller 132, the node controller 122, or a SUPER 140. Based on the price signal, the lower level controller may transmit back an estimated P and Q as well as a price bid for P and Q. The lower level controller may also communicate configuration information to the SSPS controller 112. Information communicated from the lower level controller to the SSPS controller 112 may be translated by one or more components of the system 100. Alternatively, communication information transmitted to the SSPS controller 112 may be received directly and processed by the SSPS controller 112. Based on the information received by the lower level controller, the SSPS controller 112 may transmit a constraint to the lower level controller, such as a P and Q target or set point for operation.

In one embodiment, the control channel between the SUPER 140 and the IPS 146 may be dedicated to transmitting the AC voltage references and/or the duty ratios from a controller 143 of the SUPER 140 to the IPS controller 147. A data channel (operating at a slower rate than the control channel) may be used for miscellaneous messages including health, status, setpoints, and warnings. The data framework or the messages in the data channel may support a variety of features, such as health monitoring.

The dedicated control channel may help to provide quality control bandwidth by reducing the update rate to less than a switching cycle in the IPS 146, which otherwise would be impacted as the communication is an integral part of the control loop. The communication and the synchronization channels may be fiber-based links to lower any additional latencies, avoid loss of data packets, and enhance noise immunity. Issues relating to loss of data packets in the control channel may be addressed quickly as loss may adversely impact the PWM/control signals and therefore the output of the SUPER 140. Details on the communication and the synchronization channel may be provided in accordance with the following:

|  | Control Channel | Data Channel | Synchronization Channel |
| --- | --- | --- | --- |
| Purpose | Transmit control signal (i.e., AC voltage references or duty) | Transmit other messages like health, commands, etc. | Synchronization of one or more IPSs within SUPER |
| Direction | Unidirectional (SUPER to IPS) | Bidirectional | Unidirectional (SUPER to IPS) |
| Message size | 16-bit/phase | ≥16 bits | Sync pulse ≤ fs |
| Bit/Baud rate | 6.25 Mbps | 6.25 Mbps to 100 kbps | — |
| Type | Half duplex | Full duplex | — |
| Data occurrence interval | Periodic ~ μs | Periodic ~ sub seconds/seconds | Periodic (Hz or kHz) |
| Information transfer time | <10 μs | Sub seconds ~ seconds | — |
| Peripheral used | SCI | SCI | EPWM |

There may be several message categories associated with the data channel, including the types of messages identified in the table below:

| Message Categories: | Information Flow Direction: | Messages: |
| --- | --- | --- |
| Configuration | IPS to SUPER | Converter class, operation mode, maximum and minimum voltages and power levels |
| Status | IPS to SUPER | Operation state, input and output precharging, activation |
| General Faults | IPS to SUPER | OV, UV, OF, UF, OC, OT, precharged failure, loss of communication (data and control) |
| Gate Drive Faults | IPS to SUPER | Desat, open and short circuit, and gate oxide degradation |
| Health Estimates | IPS to SUPER | Junction temperature, on state resistance, on state resistance gradient, gate leaking current, capacitance |
| Commands | SUPER to IPS | Activate, close/open contactor, and clear faults |
| Set Points | SUPER to IPS | P, Q, Vdc |

The SUPER 140 may be provided with an ethernet based control channel to communicate with the SUPER agent platform. The P and Q reference commands and other commands from the higher-level controller is translated to the SUPER through the SUPER controller 142 and can be transmitted via the ethernet channel in seconds/minutes without impacting the system performance.

In one embodiment, the SSPS controller 112 may correspond to the highest level of the control hierarchy and hosts the system level objectives including optimization algorithms for economic operation and various functions like voltage, frequency regulation, etc. The SSPS controller 110 may be mainly responsible for negotiations with the DMS 162. Based on the negotiations with the DMS 162 and the system configuration, the SSPS controller 112 may estimate the P, Q setpoints for the various components (e.g., SUPERs 140, nodes 120, or hubs 130) in the system under normal conditions. The hub controller 132 and the node controller 122, which are the next in the hierarchy, may coordinate the downstream SUPERs 140 based on the setpoints from SSPS controller 110. If the SSPS controller 112 is coordinating the SUPER 140 directly, the SUPER 140 may respond to the setpoints from the SSPS controller 112 and generate the AC voltage references/duty ratio, etc., based on the type of converter configuration of the SUPER 140.

This information may be used by the IPS controllers 147 to generate the PWM for the power stage operation. Thus, the timeline of operation of the controllers in the system may vary widely as depicted in the time diagram 400 in the illustrated embodiment of FIG. 14. In the event of abnormalities at the point of connection (POC) or at the point of common coupling (PCC), the SUPER controller 142 can autonomously respond to the abnormality without waiting for a command from the DMS 162, the frequency of which is around 10~15 minutes.

VII. SUPER

A SUPER 140 in accordance with one embodiment may be defined as a power conversion system that has one input port, one output port, and an intermediate port to which an asset (e.g., a load or a source) can be connected. The SUPER 140 may form a fundamental building block (FBB) of the system 100, and may itself include building blocks in the form of one or more IPSs 146 (which may also be described as an FBB). Additional modules or building blocks of the SUPER 140 include filter blocks, protection blocks, shielded communication or control interface blocks, and auxiliary power supply units depicted in the illustrated embodiment of FIG. 7A. An alternative embodiment of the SUPER is depicted in FIG. 7B and generally designated 140". The SUPER 140" in the illustrated embodiment includes a plurality of IPSs 146", which may be similar to the IPS 146 described herein. The SUPER 140", similar to the SUPER 140, may include a communication interface to communicate with upper level controllers (or hierarchical controllers). The SUPER 140 may also include one or more input ports and/or output ports respectively for receipt and/or transfer of power. Additionally, the SUPER 140" may include additional modules or building blocks, such as filter blocks (EMI filters and LCL filters) and additional link capacitors. Both the SUPER 140 and the SUPER 140" may include a variety of sensors operable to detect characteristics of power associated with the SUPER 140, or a component thereof. Additionally, both the SUPER 140 and the SUPER 140" may include protective circuitry as described herein. The SUPER 140 may support functions of a smart inverter, such as responding to system conditions autonomously, continuously modulating system output, continuing to operate within ranges of voltage and frequency, varying power factor, and enhancing the power quality at the POC or at the point of common coupling (PCC).

In a SUPER 140 in accordance with one embodiment, the interfaces for communication, controls, protection, and filters may be standardized for interoperability and scalability. Additionally, the subcomponents of the SUPER 140 may be optimized to enable hardware reusability that allows a SUPER 140 to be operated in one of the several converter classes described herein. For example, a two stage SUPER 140 designed with a 500~900 V DC input and 480 V, 60 Hz AC output can be operated as a GI, a DCSI and a DCLI with changes to control and protection algorithms based on grid functions as shown below:

| Type | Configuration | Control and Grid functions | Startup - Direction |
|---|---|---|---|
| GI | DC/AC | Voltage regulation, Reactive power compensation | From grid |
| ACSI | DC/DC + DC /AC | Frequency regulation, Power flow control, P/Q control | From DC source/grid |
| DCLI | DC/DC + DC/AC | Power flow control, Load transient management & Reactive power compensation | From grid |

Figure 7A:
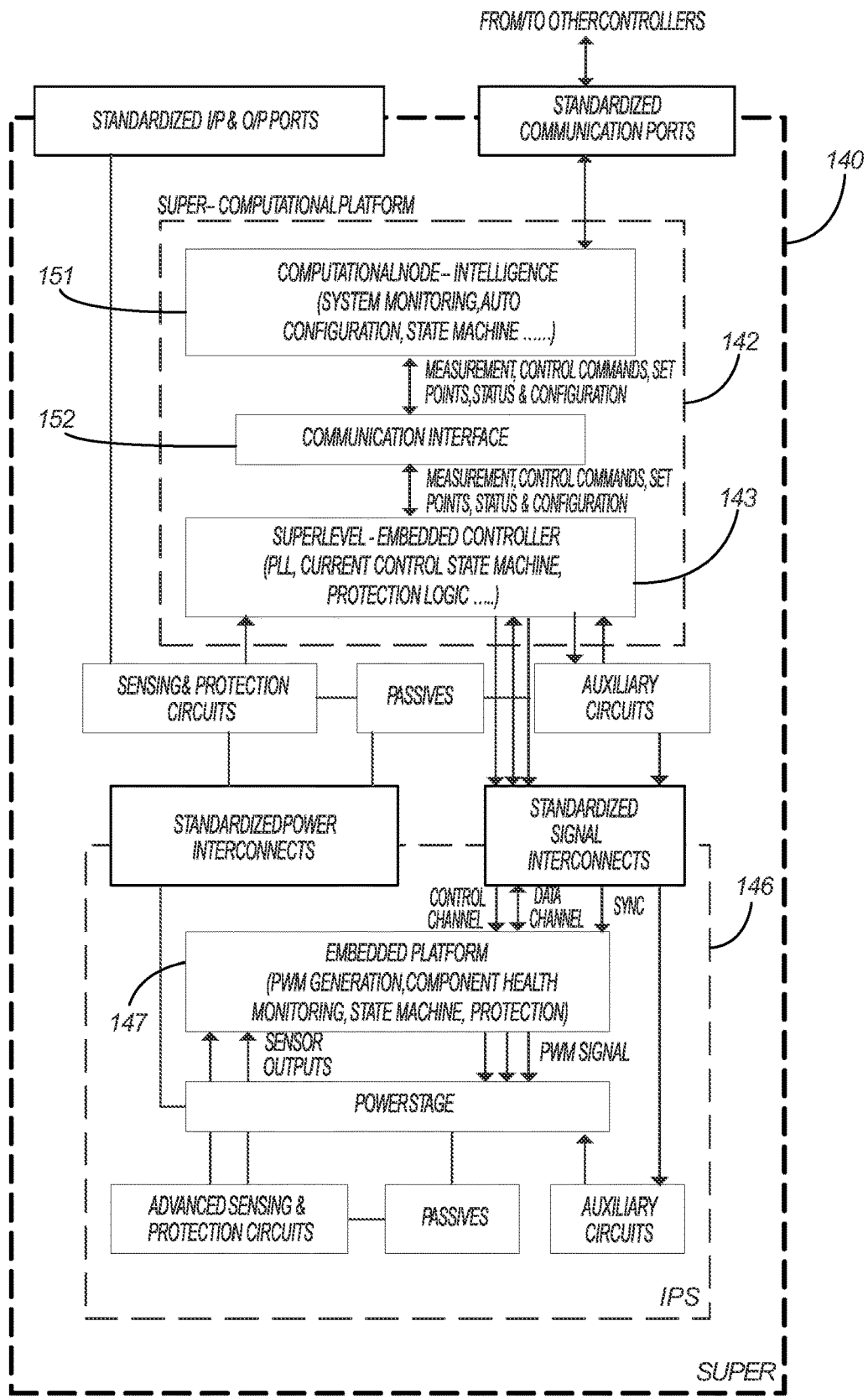
FIG. 7A shows a SUPER in accordance with one embodiment.
Figure 7B:
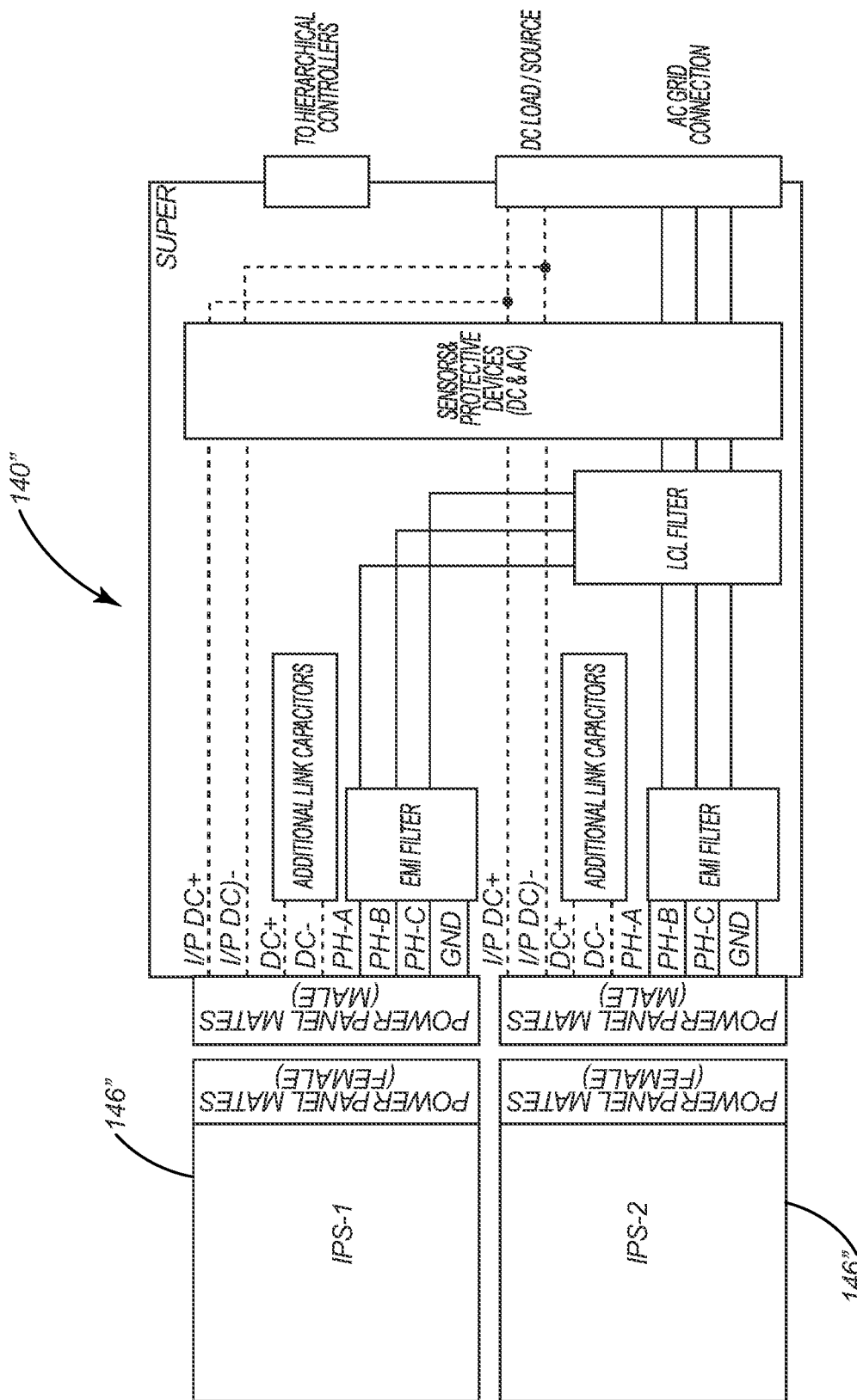
FIG. 7B shows an alternative embodiment of a SUPER with a plurality of IPSs.

The SUPER 140 may include an integral agent, e.g., a SUPER controller 142 as shown in FIGS. 7A and 7B, that helps operate the system in the required converter class and coordinate the startup, shutdown and controls based on the load and asset connected to it on the input and output port. Multiple SUPERs 140 can be coordinated as a node 120, hub 130 or a link as shown in FIGS. 4 and 5. In such a case, the SUPER controller 142 may communicate and coordinate with other SUPERs 140 and the hierarchical controller (e.g., the node controller 122, the hub controller 132, or the SSPS controller 112, or a combination thereof). In addition to the agent, the SUPER 140 may hosts a computational platform 143 for coordinating FBBs (e.g., the IPSs 146 and other blocks) within and to host algorithms associated therewith. In one embodiment, the SUPER computational platform 143 may includes the SUPER controller 142 and the agent i.e., the computational node. The SUPER controller 142 may be used for coordinating the IPSs 146.

Each converter in the node 120 and/or hub 130 may be represented by a class of PE systems that support a hierarchy of hardware and software systems. The converter as a subsystem has been termed as a SUPER 140 with a computational platform or node (the agent) interfacing with an embedded platform, such as a digital signal processor (or field programmable gate array), that orchestrates control among several switching devices as shown according to the template depicted in the illustrated embodiment of FIG. 4.

In the illustrated embodiments of FIGS. 7A, 7B, 8A, and 8B, the SUPER 140 may include an intelligent power stage (IPS) 146 including a power stage with switching devices or protection circuitry for controlling power transfer from a power input 134 to a power output 136. The IPS 146 may include an IPS controller 147 operable to control the switching device and to implement additional protection logic and encryption. Within the IPS controller 147, autonomous functions, state machines, and machine learning algorithms may be provided to control aspects of the SUPER 140.

The IPS controller 147 maybe in communication with the SUPER controller 142. The SUPER controller 142 may receive and transmit communications to the IPS controller 147 in order to direct operation of the IPS controller 147. Information communicated from the IPS controller 147 to the SUPER controller 142 may be used as a basis for directing operation of the IPS 146. Such information communicated from the IPS controller 147 may also form the basis for information transmitted from the SUPER controller 142 to an upper-level controller power control system, such as a node controller 122 and/or a hub controller 132.

Figure 8A:
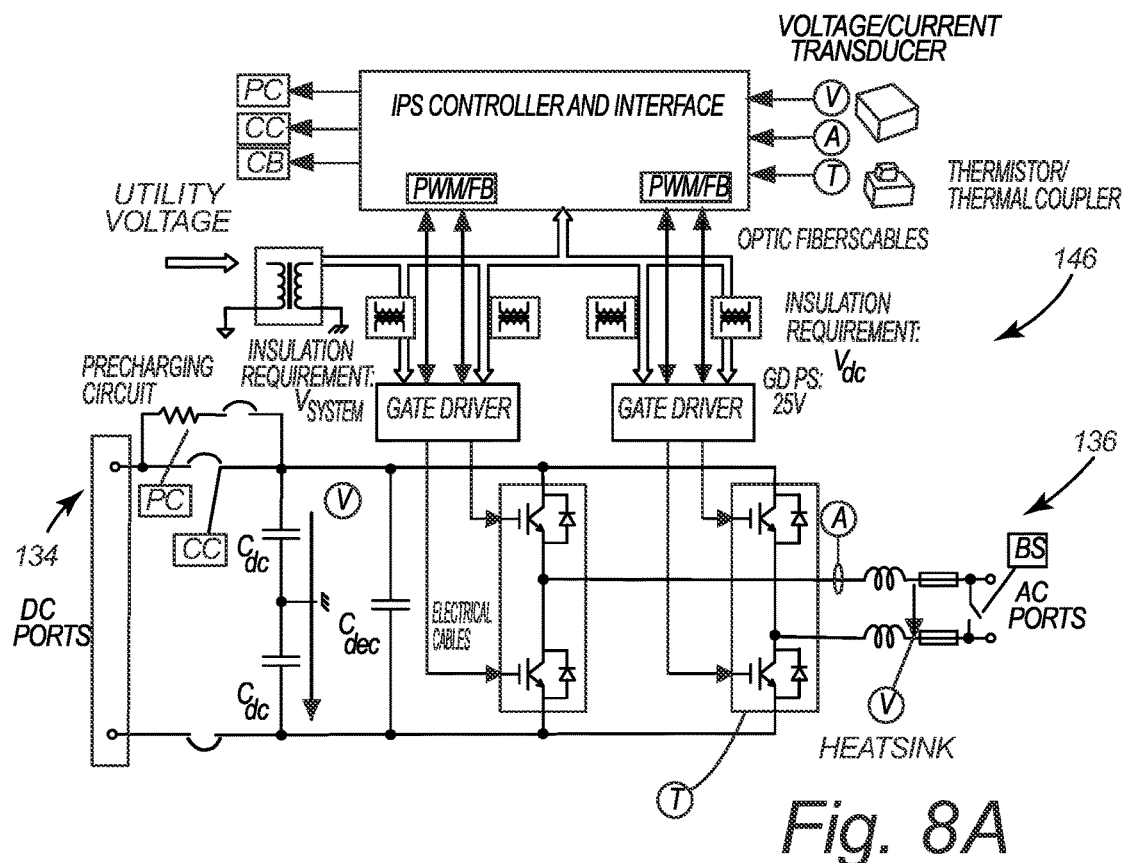
FIG. 8A shows an IPS of a SUPER in accordance with one embodiment.
Figure 8B:
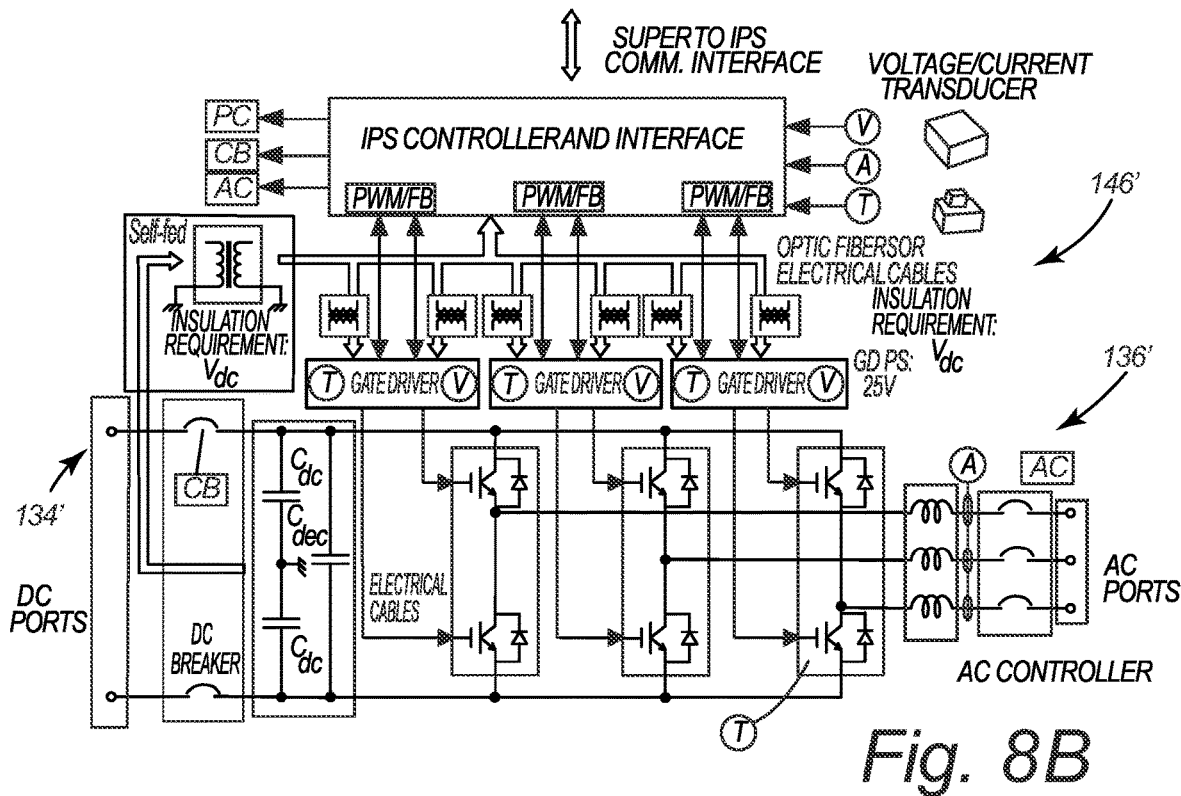
FIG. 8B shows an alternative embodiment of an IPS of a SUPER.

An alternative embodiment of an IPS is depicted in FIG. 8B and generally designated 146'. The IPS 146' maybe similar to the IPS 146 in FIG. 8A, with several exceptions. For instance, the IPS 146' is configured for three phase operation rather than the single-phase configuration of the IPS 146. The IPS 146' includes an input port 134' and an output port 136' and circuitry therebetween that may be operable to translate power received from the input port 134' into power output from the output port 136'. In the illustrated embodiment, the input port 134' is operable to receive DC power, and the circuitry of the IPS 146' it's configured to translate the DC power into a three phase output from the output port 136'.

In the illustrated embodiment, agent systems may be used to provide the innerworkings and communication between sub-systems. Examples of agent systems employed within PE systems as computational nodes include energy storage or photovoltaic systems controls. In this configuration, an agent may perform the integration of PE systems to interconnected resources and represent the SUPERS controllers of the integrated systems. A central controller, such as one or more of the hub controller 132, node controller 122, or the SSPS controller 112 may coordinate with the SUPERs 140 through an optimization algorithm. Data from learning programs and forecasting can provide additional information to the optimization formulation.

A SUPER 140, in one embodiment, may be based on a smart inverter that, while operating autonomously for grid support, may also provide a transactive embedded system. Several control aspects of the SUPER 140 and their corresponding system level affects are listed below. The SUPER 140 may be configured according to one or more of the below listed features. Metrics associated with the features may correspond to economic, reliability, reduced downtime, greater noise immunity, or grid support, or any combination thereof.

| SUPER Features: | System level input: |
|---|---|
| 1. Interoperability | Easy integration and |
| Standardized interconnects | reduction in BOS costs |
| Standardized communication ports | |
| Compliance to standards and protocols | |
| Protection | |
| From factor - Demonstrate scalability for power and voltage | |
| 2. Embedded intelligence and decision-making capability | Improved voltage profile at |
| with a flexible scalable platform | the POC |
| Interoperable/scalable with different embedded controllers (G/L) | |

| SUPER Features: | System level input: |
|---|---|
| Flexibility with open-source software<br>Respond dynamically to voltage & frequency abnormalities etc.<br>Monitor the point of connection continuously<br>Immediate response to internal and external faults with least impact to the system<br>Converter functioning is not compromised with loss of communication | De-rated/continuous operation during failure events |
| 3. Embedded online health monitoring system - Diagnostics/Prognostics<br>Metering to be included - Calculations of P and Q for control and diagnostics<br>Monitors the health and lifetime of components including passives in the system<br>Captures and/or maps faults to their corresponding signatures<br>Robust and/or retrievable events and data logging system (Non-real-time/ Offline) | Allows maintenance to be pre-planned<br>Prevent the loss of the inverter from affecting the overall system<br>Increase lifetime<br>Data for offline learning algorithms |
| 4. Cyber-physical security<br>Hardware and software mechanisms to secure power electronics systems | Improved protection against cyber threats |
| 5. Self-contained intelligent power stages<br>Embedded passives, auxiliary power, sensors, processors etc. | Decouples parasitics and noise loops<br>Additional sensing & processor can be utilized for internal health monitoring of IPS |

Additional functions for controls for the SUPER 140 are provided in the table below.

Additional functions for protection and maintenance for the SUPER 140 are provided in the table below.

| Function Type: | Description: | Functions: | Hosted In: |
|---|---|---|---|
| Autonomous (Operates with static setpoints) | No communication architecture needed<br>Behavior controlled by inverter operating parameters<br>Parameters defined as system commissioning or later<br>Parameters can be adjusted, behavior activated or deactivated at later date via remote or on site changes Impacts the PCC/POC directly | Low/high voltage ride through<br>Frequency ride through<br>Volt-var control (via dynamic reactive power injection)<br>Anti-islanding<br>Ramp-rate controls (for default/emergency conditions)<br>Provide reactive power (via fixed power factor)<br>Frequency - Watt<br>Volt - Watt<br>Dynamic reactive current injection | SUPER and IPS<br>SUPER |
| Non autonomous operation | Communications and control infrastructure utilized<br>Direct control of inverter behavior<br>Control from remote operator commands or feedback, based on conditions at PCC | Command DER to connect or disconnect<br>Limit/set real power<br>Respond to pricing signals<br>Participate in automatic generator control (AGC)<br>Provide spinning reserves or bid into market<br>Update static set points for autonomous functions (fixed power factor, Volt-var curves, voltage ride through, frequency ride through) | SUPER |
| Intelligent Features | Embedded software framework and communication<br>Architecture for decision making | Intelligently operates the converter even with loss in communication | IPS |
| | Direct control of inverter behavior<br>Communication with another controller with respect to any change in operating conditions | Inherent black start capability to maintain critical loads in the event of grid failures or catastrophic failures | SUPER |
| | | Controller parameter tuning | SUPER |
| | | Adaptive algorithms for grid functions such as frequency and voltage regulation.<br>Dynamic selection and varying of the converter mode of operation depending on system conditions | SUPER |
| | Functions internal to the SUPER 140 or the system 100 | Anomaly detection (e.g., cyber attacks, fault conditions) | SUPER and IPS |

| Function Type: | Description: | Functions: | Hosted In: |
| --- | --- | --- | --- |
| Intelligent Features - Protection | Embedded software framework and communication Architecture for decision making Direct control of inverter behavior Communication with another controller with respect to any change in operating conditions Functions internal to the SUPER 140 or the system 100 | Fault Tolerant Capability - respond to internal and external system faults with low or least impact to the system and degrade gracefully | SUPER |
| | | Manage the startup and shutdown of the system under normal and catastrophic conditions | SUPER and IPS |
| | | Hot swap capability | SUPER |
| | | Auto/self-configure the system based on the load/source attached to it and based on its protection circuitry | SUPER |
| Intelligent Features - Maintenance | | Reliability (e.g., lifetime based and self-awareness control, such as management of DER charge/discharge raids based on lifetimes or active thermal/power flow control | SUPER |
| | | Adaptive flow rate (air) control | SUPER and IPS |
| | | Preventative maintenance prognostics | SUPER and IPS |

Figure 29:
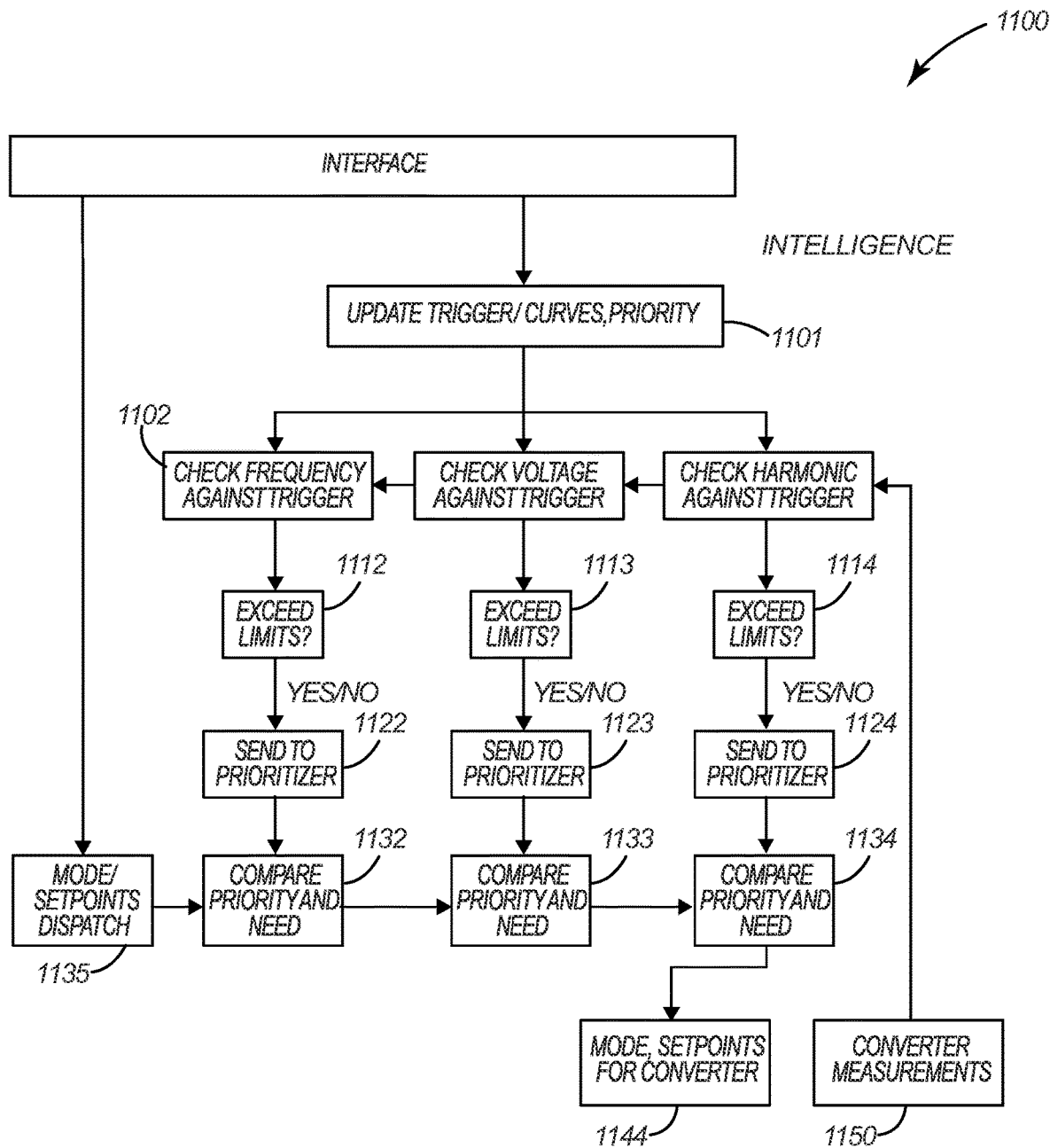
FIG. 29 shows a method for embedding intelligence and decision making in a system according to one embodiment.

A method of operation for a SUPER controller 142 in accordance with one embodiment is shown in FIG. 29 and generally designated 1100. As described herein, the SUPER controller 142 may receive information via an interface from an upper level controller. Such information may include triggers or curves (or thresholds) and/or priority information. Step 1101. The information received via the interface may be analyzed or compared against one or more parameters, such as for frequency, voltage, or harmonics. Steps 1102, 1103, 1104. The parameters may be obtained via measurements from the IPS 146 and/or another component of the SUPER 140. Step 1150. The one or more parameters may be analyzed to determine if they exceed a limit based on information received from the upper level controller. Steps 1122, 1123, 1124. Information pertaining to whether the one or more parameters are above or below limits based on information received from the upper level controller may be compared against priority and to determine a mode and set points for converter operation (e.g., operation of the IPS 146). Information received via the interface may also include mode or set points to dispatch to the SUPER 140 or component thereof. This information may also form a basis for determining a mode or set points for the converter. Step 1144.

Figure 30:
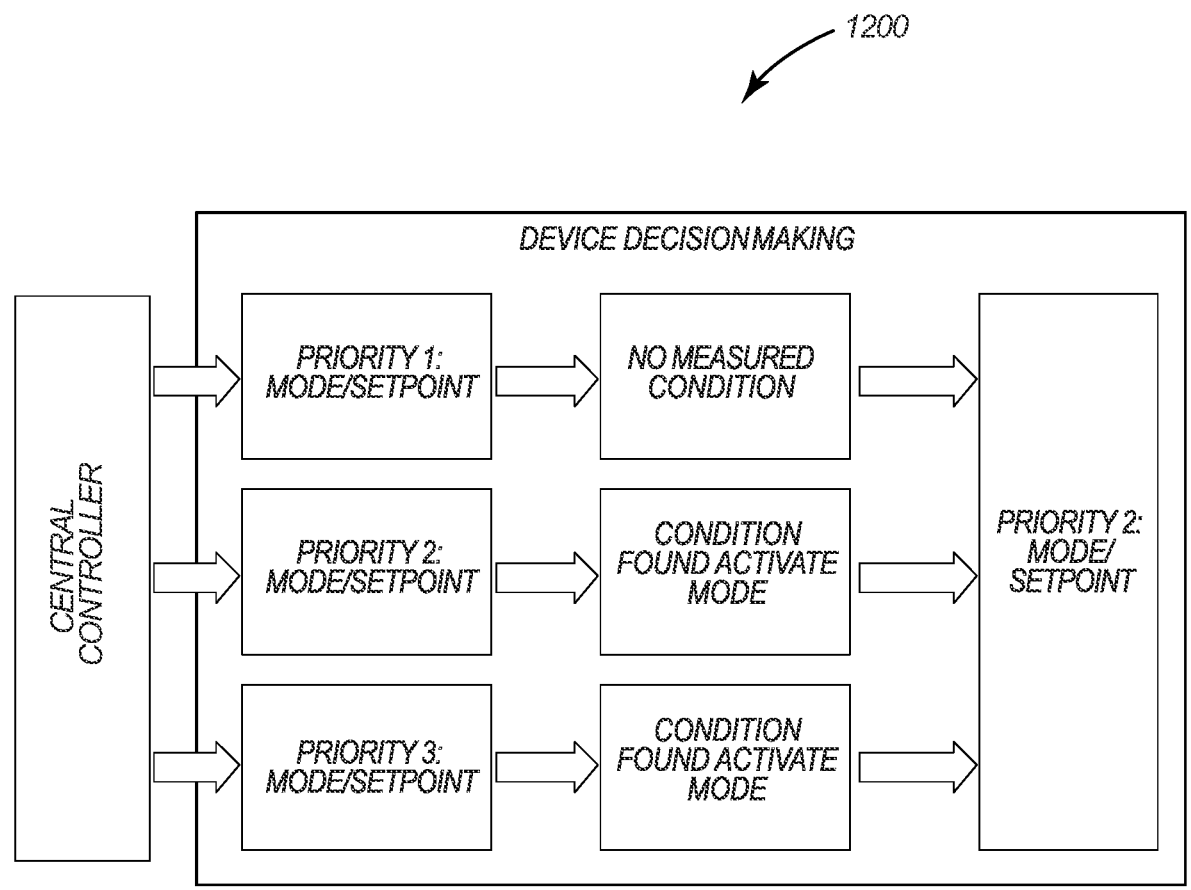
FIG. 30 shows a method according to one environment.

A decision tree in accordance with one embodiment of the present disclosure is shown in FIG. 30 and generally designated 1200. The decision tree is a decision-making process flow with criteria 1102, 1112-1114, 1122-1124 used to determine and designate a set of autonomous actions of the SUPER in accordance with the setpoints and limits provided in 133. The setpoints and limits of 133 are provided by the SSPS, node, or hub systems through solutions developed by artificial intelligence or optimization approaches.

VIII. IPS

As described herein, the SUPER 140 may include one or more IPSs 146. The IPS 146 may be a self-contained holistic power stage (single or multiple stages) with an input 134, output 136, and intermediate ports (as needed) that can be cascaded or paralleled (such as the configuration depicted in FIG. 8A) within the SUPER 140 to meet a target power processing capability. The components of an IPS include a computational platform (e.g., an IPS controller 147), storage or data logging units, an auxiliary power supply unit, protective devices, minimum magnetics, embedded sensors, and standardized interfaces, or a combination thereof. To enhance interoperability and scalability with features like hot swapping, IPSs 146 may be configured with protection circuitry on the input 134 or output 136, or both, to allow for complete isolation of the subsystem. The IPS 146 may be provided with dedicated communication and synchronization links to coordinate with the SUPER 140. An IPS 146 may be configured to provide a health monitoring service for the power stage and cyber-physical security to improve the system level reliability and resiliency.

The IPS 146 may be configured according to one or more of the below listed features:

| IPS Features | SUPER level impact |
| --- | --- |
| 1. Interoperability Standardized electrical ports and communication interface Enclosure scalability and standardization Compliance to standards and protocols | Allow for standardized IPSs connected to the standardized SUPER to be swapped in and out and easily Standardize IPS power ratings and the corresponding form factors |
| 2. Embedded intelligence and decision-making capability with a flexible scalable platform Interoperable/scalable with different embedded controllers Monitors the point of connection continuously Easy transition between control mode required by SUPER Immediate response to IPS internal faults with least impact to the SUPER | Provide sufficient computation and communication capabilities to handle the rapid command implementation, control algorithm, and heavy communication and data-logging burden between the SUPER 140 and the IPS 146 Coordinate with more intelligent IPS subcomponents to enable features |
| 3. Embedded online health monitoring system - Diagnostics/Prognostics | Provide industry standard module packaging pattern and corresponding thermal monitoring |

-continued

| IPS Features | SUPER level impact |
|---|---|
| Embeds temperature sensors in IPS to enhance thermal monitoring for prognostics | Evaluating the IPS level health status and conditions to provide most precise information to the SUPER 140. |
| Monitors the health and degradation status of critical components in IPS | |
| Captures and/or maps faults to their corresponding signatures | |
| Robust and/or retrievable events recording and reporting system | |
| 4. Cyber-physical security | Protect bottom layer components from cyber attacks |
| Hardware and software mechanisms to secure power electronics systems | by means of hybrid (analog and digital) configurations |
| 5. Self-contained auxiliary power supply units | Provide shutdown during system crash and reduce or minimize |
| Draws the required power from IPS itself and power the contained components | electrical interconnection to enhance our maximize plug and play aspects and to simplify manufacturing |
| 6. Integrated minimum passive, intelligent gate driving, sensing and protection | Lower the corresponding electrical stresses for components, regardless of normal or fault operating conditions |
| Standardized minimum integrated passives | Provide reliable switching events and potentially reduce |
| Intelligent and robust gate driving scheme | switching losses |
| Integrated sensing and protective device | Isolate the IPS during fault scenarios |

Methods of operation for the SUPER 140 and the IPS 146 in accordance with one embodiment are depicted in FIG. 17 and generally designated respectively 700, 800. The methods 700, 800 may correspond to state machines implemented respectively by the SUPER controller 142 and the IPS controller 147. It is to be understood that the state machines implemented by the SUPER controller 142 and the IPS controller 147 may be different from the state machines shown in the illustrated embodiment. For example, one or more steps may be removed or adapted with respect to the methods 700, 800. Additionally, or alternatively, steps may be added to the methods 700, 800.

Figure 18:
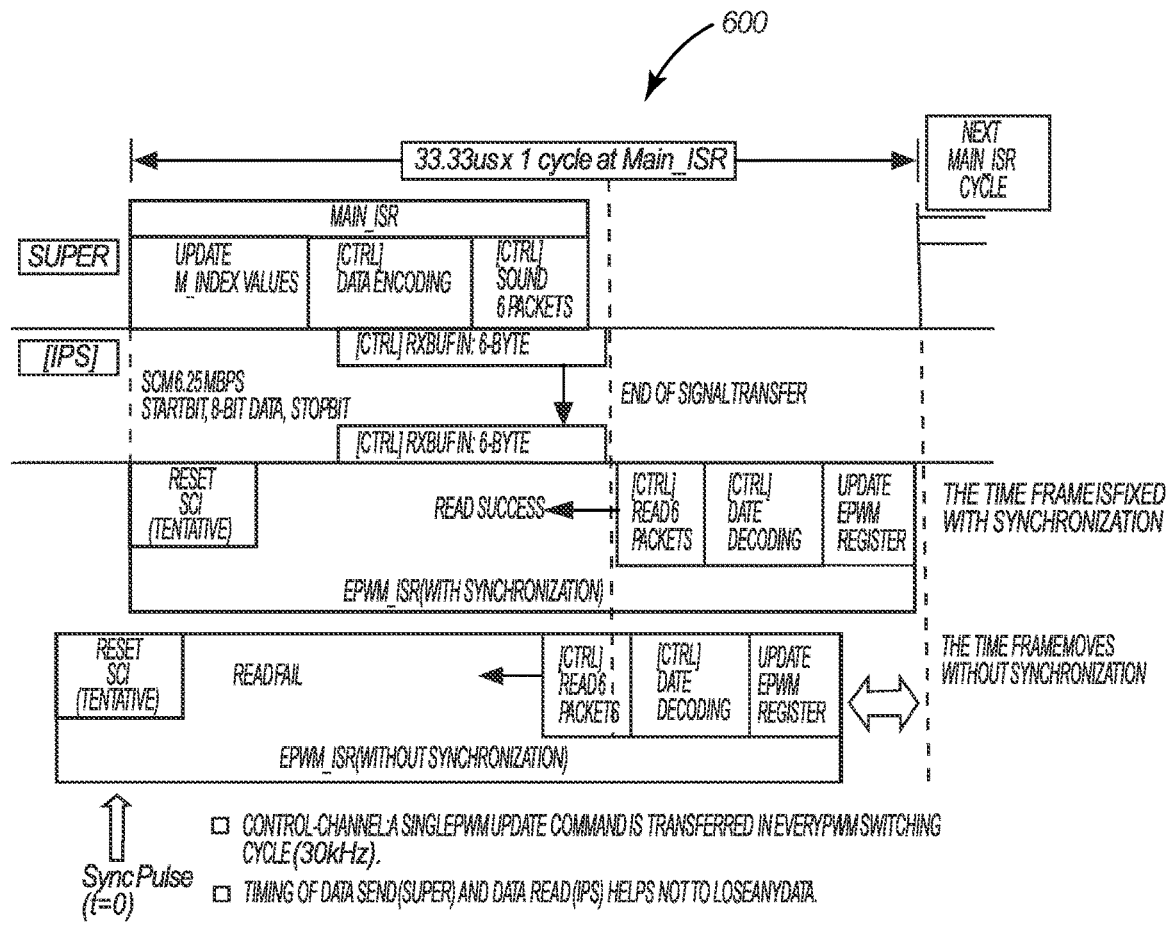
FIG. 18 shows a timing diagram for synchronized operation of an IPS and a SUPER in accordance with one embodiment.

The SUPER computation platform in the illustrated embodiment is depicted with a controller 143 operable to execute the state machine and a resource integration controller 141 operable to communicate between external components (e.g., an upper level controller) and the controller 143. The state machines executed by the controller 143 and the IPS controller 147 may be closely coupled in order to effect operation in an efficient manner, while enabling the resource integration controller 141 and/or other aspects of the SUPER controller 142 to handle operations that are less time sensitive. A timing diagram of communications between the state machines of the controller 143 in the IPS controller 147 is depicted in illustrating embodiment of FIG. 18 and generally designated 600. Communication and synchronization utilized for controls of the IPSs 146 by the SUPER 140 may be conducted in accordance with the timing diagram.

Figure 19:
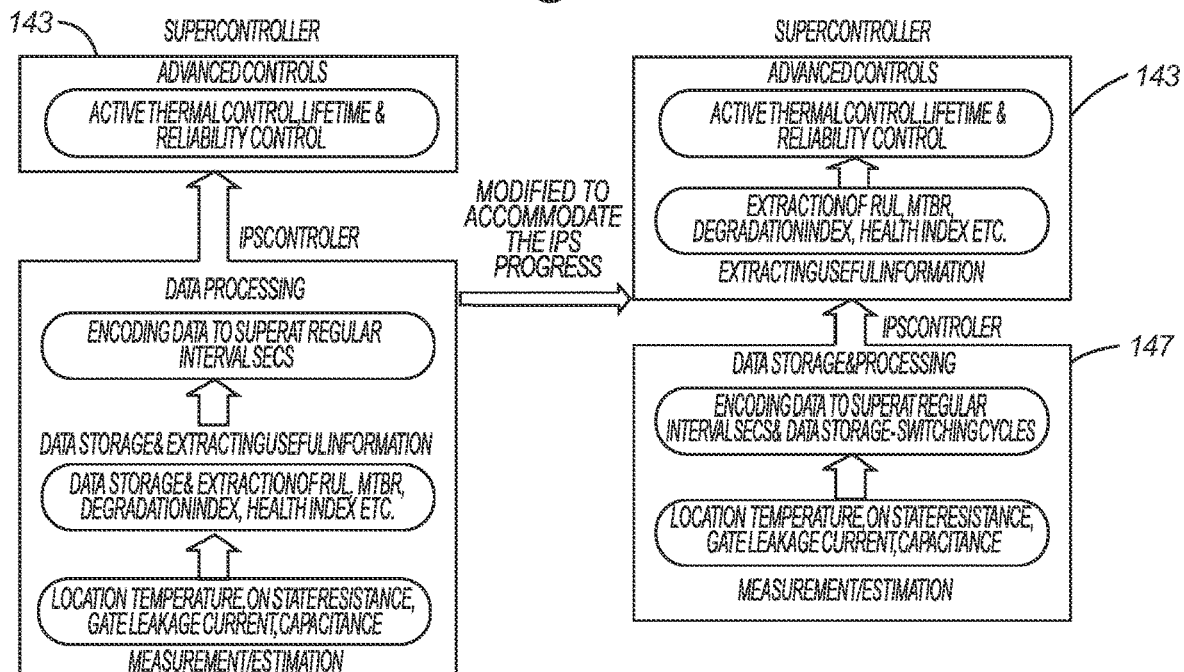
FIG. 19 depicts a framework for health monitoring in a SUPER and an IPS in accordance with one embodiment.

A health monitoring framework for the IPS 146 in accordance with one embodiment is depicted in FIG. 19 for two different arrangements of SUPERs 140 and IPSs 146.

Health monitoring may predominantly involves the following stages: measurement/estimation, data storage, data processing and additional controls. Estimation may be done at both the SUPER level and the IPS level based on the components present in both. The measurement and estimates from the IPS 146 can be stored and processed locally in the IPS 146 and/or the processing can be done at SUPER level.

IX. Modular Aspects

To provide modularity and scalability, SSPS 110 may include several fundamental building blocks, such as SUPERs 140 and IPSs 146. These fundamental building blocks may allow the distribution/segregation of controls, protection, and intelligence at various levels of the hierarchy, enabling fast decision-making capability and response to transient or abnormal conditions. Additionally, the fundamental blocks may be equipped with added features, such as cyber-physical security, health monitoring to facilitate resilient and reliable grid interfaces. The fundamental blocks may be configured together as a multiport system (e.g., scalable and interoperable) and present themselves as a single transactive node to the grid in case of a node/hub/link. This consolidation in turn increases the grid security by reducing or minimizing the number of PE interfaces in the grid.

The architecture of the SSPS 110 may allow for automation of energy flow between sources and loads, including between assets 150 that operate as sources and loads. In addition to the automated energy management, the SSPS 110 may maintain operation according to power quality requirements and the functionalities stipulated by grid standards such as IEEE 1547 and beyond. For instance, up to twelve grid functions including power management, voltage and frequency regulation, grid forming capability, and black start capability have been identified and can be realized simultaneously via the SSPS 110. The table below identifies functionalities of the SUPERS 140 according to different converter classes and emphasizes segregation capabilities (+ indicates inclusion of a function and − indicates absence).

| # | Function | GI | ACSI and DCSI | ACLI and DCLI |
|---|---|---|---|---|
| 1 | Power and energy management (PEM) for economic operation | − | + | + |
| 2 | Voltage support (PQ, Volt-var, constant Q) | + | + | + |
| 3 | Phase balancing | − | + | − |
| 4 | Flicker reduction | − | + | − |
| 5 | Power factor correction | + | − | + |
| 6 | Frequency support (Freq-Watt) | − | + | − |
| 7 | Active harmonic filtering | + | − | − |
| 8 | Grid forming capability | − | + | − |
| 9 | Black start capability | − | + | − |
| 10 | Voltage and frequency ride through | + | + | + |
| 11 | Cyber security | + | + | + |

Figure 20:
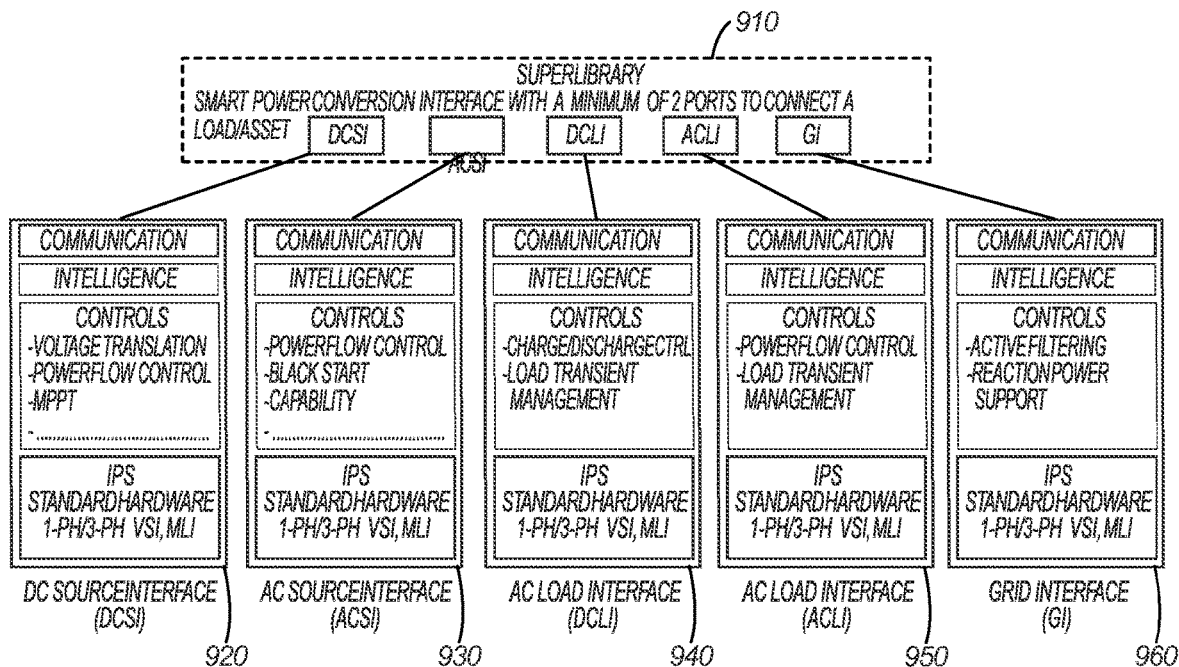
FIG. 20 shows a SUPER library according to one embodiment.
Figure 21:
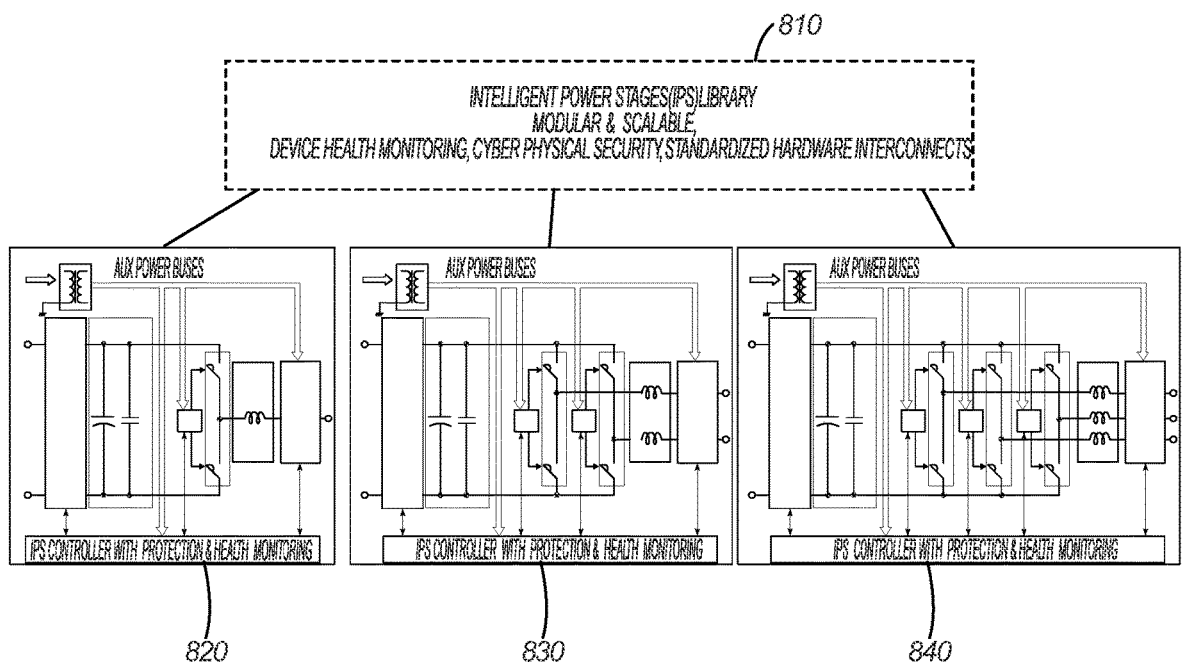
FIG. 21 shows an IPS library according to one embodiment.

A library of building blocks or modular aspects can be used in the SSPS architecture, such as to build the nodes 120 and hubs 130 for various applications. A SUPER library 910 in accordance with one embodiment is depicted in FIG. 20. The library may define a set of converter classes from which each of the SUPERs 140 may be configured. The library 910 in the illustrated embodiment includes the converter class and is described herein: DCSI 920, ACSI 930, DCLI 940, ACLI 950, and GI 960. These converter classes can be built using different IPS libraries from an IPS library 810, shown in FIG. 21, and includes half bridge 820, full bridge 830, or three-phase configuration 840. Additional or variations of these modules of the IPS library 810 may be provided. The modules of the SUPER library 910 and/or the IPS library 810 can be designed to accommodate various voltage, power, and frequency ranges with a variety of modulation strategies to build nodes 120 and hubs 130 from the distribution up to the generation scale.

As described herein, the SUPERs 140 may be configured as a modular component of the system 100. The SUPERs 140 may be both adaptable and standard and implemented so that interoperability within the system 100 may be provided despite use of differently configured SUPERs 140. The SUPERs may be described as fundamental building blocks (FBBs).

Interoperability of SUPERs 140 may translate into enabling strategical coordination (e.g., control, communication, and protection coordination) of multiple SUPERs in the system 100. Coordination of multiple SUPERs 140 may call for standardization of interfaces and interconnections. Standardization of communication protocols, messages between the different entities, control coordination, synchronization of the different entities, and timing requirements may be provided in order to satisfy interoperability specifications and to enable coordinated hierarchical control.

Modular SUPERs 140 that allow scaling with regards to voltage and current may be used to develop grid connected systems that tie to secondary distribution scale feeders. Modular and holistic design (e.g., with controls, protection, synchronization, and communication) may enable plug and play to maintain and service the submodules as required while reducing or minimizing the down time. It is noted that scaling can introduce additional challenges with regards to circulations in the system 100; therefore scaling may be constrained by the availability of the required power and communication interconnections or interfaces and the sub-components of the SUPERs 140.

As described herein, the SUPERs 140 may be used to build various PE interfaces of various converter class types, such as DCLI, ACLI, DCSI, ACSI and GI. The SUPERs 140 may utilize a standard construction across the converter class types. For instance, the SUPERs 140 may support a) startup from the DC or AC side based on the current direction or information on assets 150 (e.g., a source or load) connected to the system, b) components selected or optimized to handle the various operating conditions and grid functions, and c) sensing and protection circuitry to isolate and/or connect the systems and the subsystems. A standardized design portion of the SUPERs 140 may enable hardware reusability i.e., a given hardware with a particular configuration can be made to function as a DCSI/DCLI/GI by only changing the software layer, the controller, or the computational platform.

To enhance the grid reliability, resiliency, and power quality and to reduce the operating and maintenance of systems, the SUPERs 140 may be equipped with features, such as online health monitoring (prognostics/diagnostics), cyber physical security, embedded intelligence and decision-making capability, and control algorithms. These capabilities may be enabled by computational capabilities, storage or data logging units, and advanced sensing provided in the SUPER 140, as described herein.

X. Optimization

The system 100 may implement an optimization architecture in accordance with one or more embodiments described herein. An example optimization architecture is depicted in the illustrated embodiment of FIG. 27 and designated 1000. In the illustrated embodiment, optimization may be conducted by each of the SSPS controllers 112 coupled to the DMS controller 162. Each SSPs controller 112 may include a global optimizer and a local optimizer, where the global optimizer may determine aspects related to economic regulation, voltage regulation for multiple nodes 120 in a three phase distribution feeder, or a single lateral or a geographic area. The local optimizer may be configured to split apparent and reactive power (P and Q) internally in small intervals, such as one to three minutes, among assets 150 in each node 120 based on a cost function. The cost function may vary from application to application. In one embodiment, the global optimizer may reside in the SSPS controller 112 while the local optimizer may reside in the node controller 122 or the hub controller 132. The cost function may vary between the global and the local optimizer.

In the illustrated embodiment, the DMS 162 may negotiate a net P and Q for each SSPS 110. The SSPS controller 112 may manage internal resources to beneath the negotiated net P and Q for the respective SSPS 110. This method may be extended to other services of the system 100, such as sequence currents for a phase balancing or harmonic components for active filtering/compensation.

Figure 26:
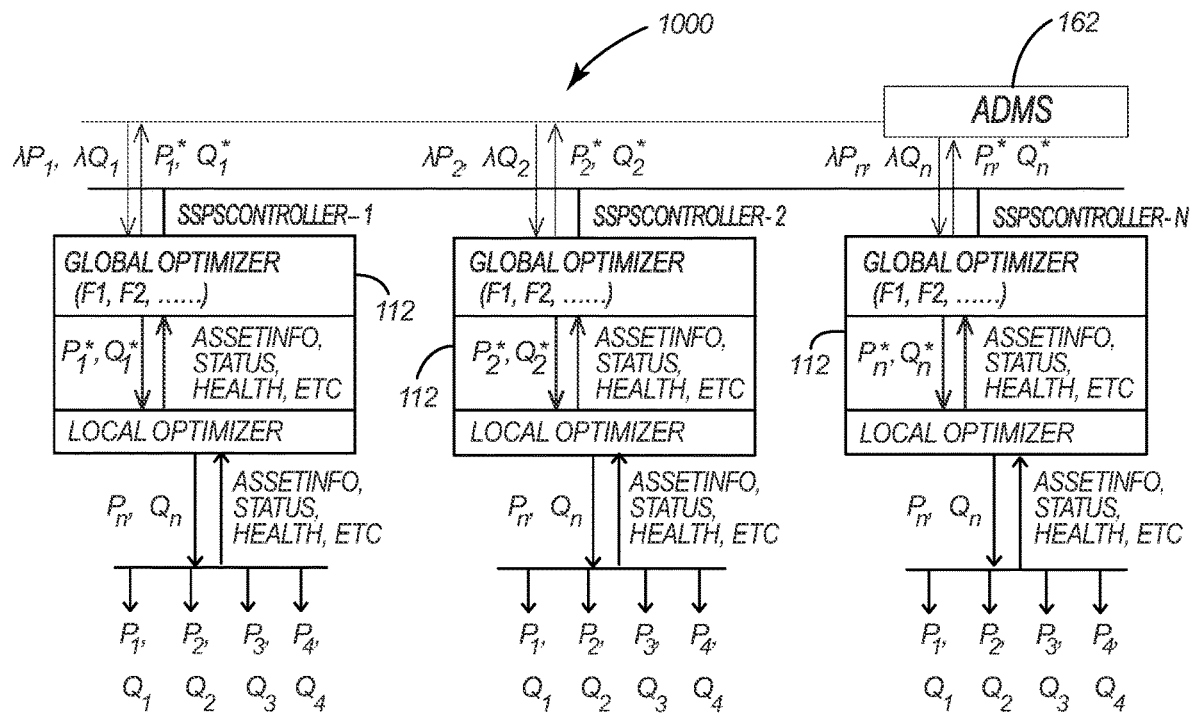
FIG. 26 shows an optimization framework in accordance with one embodiment.
Figure 27:
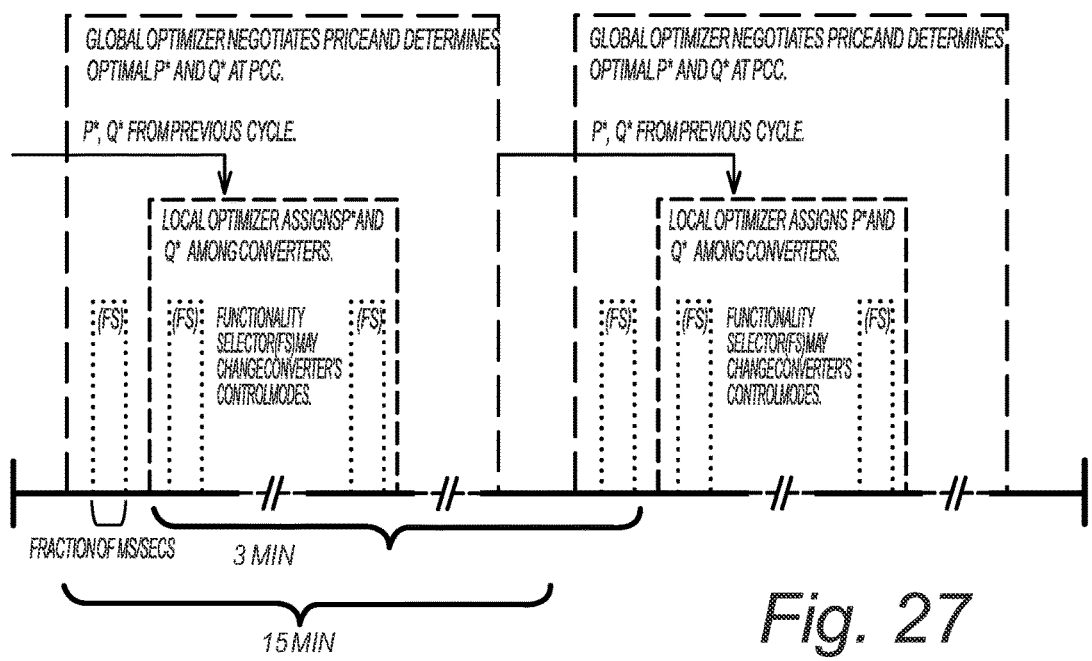
FIG. 27 shows a timing diagram for the optimization framework of FIG. 26.

A timing example of the optimization architecture 1000 in accordance with one embodiment is depicted in FIG. 27. As can be seen, the net P and Q may be negotiated over a large period of time, such as every 15 minutes. Within this large period of time, the P and Q may be assigned and reassigned for each converter multiple times. Each converter may be assigned a P, and Q, (shown in FIG. 26) over a shorter period of time, such as three minutes. In the case of abnormal conditions, the functionality selector of the SSPS controller 112 may dictate a mode of operation.

The optimizer may enable price negotiation of SSPS or customers with respect to the DMS 162 for energy and ancillary surfaces. The architecture 1000 may change traditional paths of customers into active customers, which could consume or generate energy as well as provide ancillary services, such as voltage or frequency regulation, or protection, phase balancing, or power quality improvements, or a combination thereof.

Figure 28:
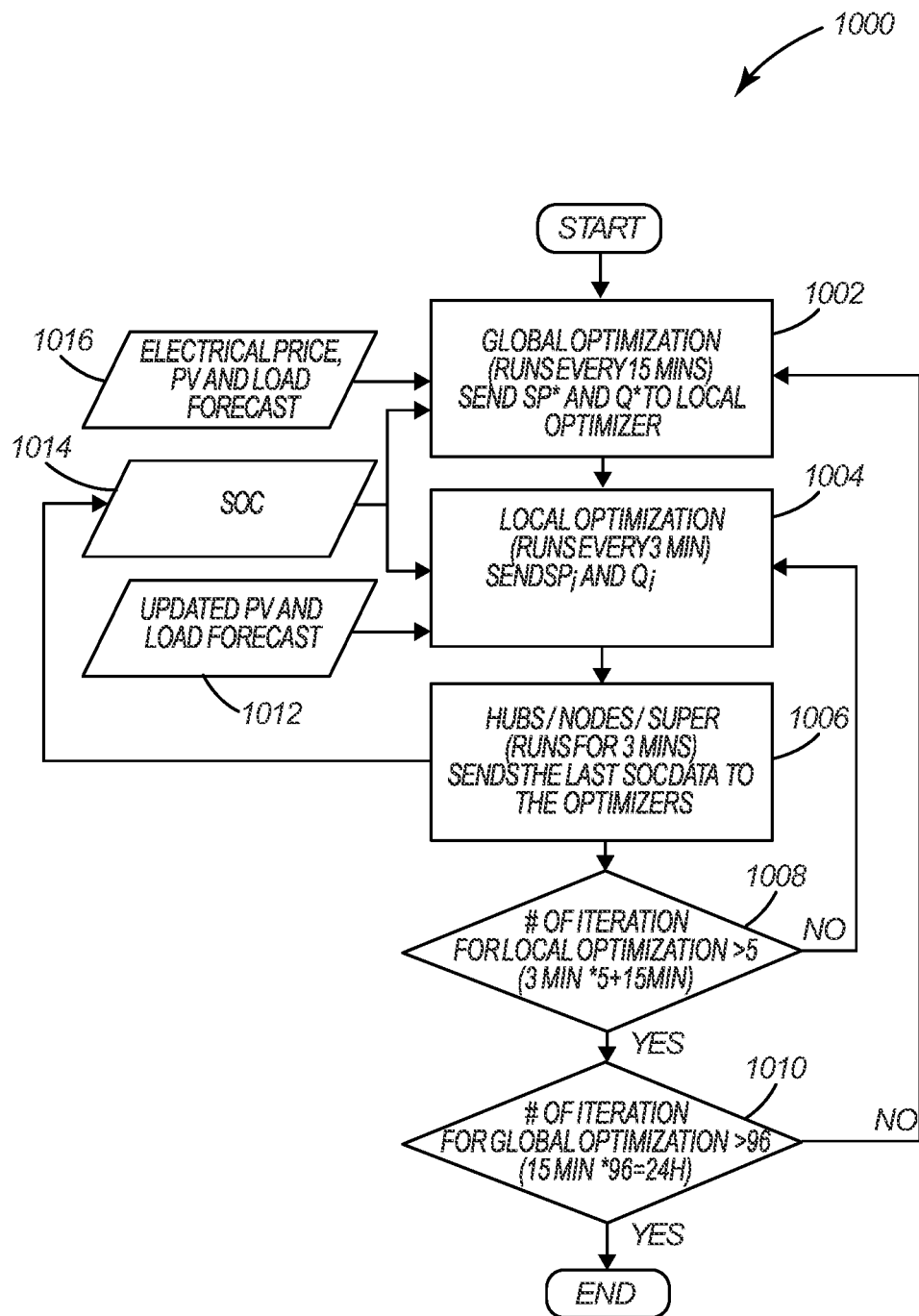
FIG. 28 shows a method for system level optimization according to one embodiment.

The optimization architecture 1000 in accordance with one embodiment is shown in further detail in FIG. 28 and includes several method steps. As described herein, a global optimization may send P and Q to a local optimizer at a periodic rate, such as 15 minutes. Steps 1002, 1010. The global optimizer may determine P and Q based on electricity price, PV and load forecast. Steps 1016, 1002. The global optimizer may also determine P and Q based on state of charge. Steps 1014, 1002.

The local optimizer may send P and Q values or constraints to components corresponding to the next level below the SSPS controller 112. The local optimizer may transmit such values at an interval that is faster than the interval of the global optimization interval, such as every three minutes. Steps 1004, 1008. The local optimizer may determine the P and Q values for assets below the SPS controller 112 based on state of charge and an updated PV and load forecast period steps 1014, 1012. The hubs 130, the nodes 120, or the unattached SUPERs 140 may operate during the interval for the local optimizer and transmit information, such as state of charge, to be used by the SPS controller 112 to determine global optimization and/or local optimization outputs. Steps 1006, 1014.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A solid-state power substation (SSPS) system comprising:
    a plurality of smart universal power electronic regulators (SUPERs), each SUPER comprising an intelligent power stage (IPS) operable to control power transferred through the SUPER from a power input to a power output, the plurality of SUPERs including multiple SUPERs each configured according to one of a plurality of converter classes;
    wherein the plurality of converter classes includes a DC load interface (DCLI) and an AC load interface (ACLI);
    a first level controller communicatively coupled to each of the plurality of SUPERs, the first level controller configured to transmit and receive communications to each of the plurality of SUPERs, the first level controller operable to transmit SUPER constraints to each of the plurality of SUPERs;
    a feeder operable to supply or receive power from a SUPER of the plurality of SUPERS;
    wherein each of the plurality of SUPERs is configured to control a characteristic of the power transferred from the power input to the power output based on the SUPER constraints received from the first level controller;
    wherein each of the plurality of SUPERs includes a controller operable to transmit and receive communications from the first level controller, wherein the controller of each of the plurality of SUPERs is operable to receive IPS health information from the IPS, wherein the controller of each of the plurality of SUPERs is operable to transmit sensor information and health information to the first level controller, wherein the health information transmitted from the controller to the first level controller is based on the IPS health information received by the controller from the IPS;
    a second level controller communicatively coupled with the first level controller along with at least one additional first level controller, the second level controller configured to receive information from the first level controller pertaining to distribution of power to the plurality of SUPERs under control of the first level controller and additional information pertaining to distribution of power to a second plurality of SUPERs under control of the at least one additional first level controller, wherein the second level controller is operable to supply command information to direct the first level controller and the at least one additional first level controller to coordinate optimal power distribution relative to both the plurality of SUPERs under control of the first level controller and the second plurality of SUPERs under control of the at least one additional first level controller; and
    wherein the first level controller is operable to determine the SUPER constraints for each of the plurality of SUPERs based on the sensor information and the health information received from each of the plurality of SUPERs and the command information received from the second level controller, wherein the SUPER constraints are determined so that power transmission to and/or from each of the plurality of SUPERs is coordinated in aggregate by the first level controller for optimization of power distribution across the plurality of SUPERs under control of the first level controller and the second plurality of SUPERs.

2. The SSPS system of claim 1 wherein the plurality of converter classes includes an AC source interface (ACSI) and a DC source interface (DCSI).

3. The SSPS system of claim 2 wherein the plurality of converter classes includes a grid interface (GI).

4. The SSPS system of claim 1 wherein the IPS is operable to receive DC power at the power input and to generate AC power at the power output.

5. The SSPS system of claim 4 wherein the AC power is single-phase or three-phase power.

6. The SSPS system of claim 1 wherein the controller is operable to direct power regulation and control modes for apparent power and reactive power with respect to fundamental and $n^{th}$ component harmonics.

7. The SSPS system of claim 1 wherein the IPS is configured to transfer power from the power input to the power output according to IPS constraints received from the controller, wherein the controller determines the IPS constraints based on the SUPER constraints.

8. The SSPS system of claim 1 wherein the IPS is configured to communicate IPS sensor information to the controller, and wherein the controller is configured to determine the sensor information based on the IPS sensor information, wherein the IPS sensor information includes at least one of current, voltage, junction temperature for a semiconductor device, and health information for one or more components of the IPS.

9. The SSPS system of claim 1 wherein, based on the SUPER constraints received from the first level controller, the controller is configured to direct operation of the IPS to control voltage, current, phase, and balancing.

10. The SSPS system of claim 1, wherein the SUPER includes a communication control protection and synchronization architecture to coordinate components of the SUPER including the IPS, and wherein the first and second level controllers communicate with the controller of the SUPER via a separate communication architecture.

11. The SSPS system of claim 1, wherein the health information includes one or more of on-state resistance, junction temperature, and gate leakage current.

12. The SSPS system of claim 1, wherein the SUPER includes a plurality of IPSs, wherein the SUPER is configured to transmit IPS control information to the each of the plurality of IPSs to affect operation of each of the plurality of IPSs.

13. A solid-state power substation (SSPS) system for a power distribution system, the SSPS system comprising:
a plurality of smart universal power electronic regulators (SUPERs), each SUPER including an intelligent power stage (IPS) operable to control power transferred through the SUPER from a power input to a power output, the plurality of SUPERs including multiple SUPERs each configured according to one of a plurality of converter classes, the plurality of SUPERs including a standardized input interface and a standardized output interface for all of the plurality of converter classes;
wherein the plurality of converter classes includes a DC load interface (DCLI) and an AC load interface (ACLI);
a first level controller communicatively coupled to each of the plurality of SUPERs, the first level controller configured to transmit and receive communications to each of the plurality of SUPERs, the first level controller operable to transmit SUPER constraints to each of the plurality of SUPERS;
wherein each of the plurality of SUPERs is configured to control a characteristic of the power transferred from the power input to the power output in accordance with commands received via the standardized input interface and based on the SUPER constraints received from the first level controller;
wherein each of the plurality of SUPERs includes a controller operable to transmit and receive communications from the first level controller, wherein the controller of each of the plurality of SUPERs is operable to receive IPS health information from the IPS, wherein the controller of each of the plurality of SUPERs is operable to transmit sensor information and health information to the first level controller in accordance with the standardized output interface, wherein the health information transmitted from the controller to the first level controller is based on the IPS health information received by the controller from the IPS;
a second level controller communicatively coupled with the first level controller along with at least one additional first level controller, the second level controller configured to receive information from the first level controller pertaining to distribution of power to the plurality of SUPERs under control of the first level controller and additional information pertaining to distribution of power to a second plurality of SUPERs under control of the at least one additional first level controller, wherein the second level controller is operable to supply command information to direct the first level controller and the at least one additional first level controller to coordinate optimal power distribution relative to both the plurality of SUPERs under control of the first level controller and the second plurality of SUPERs under control of the at least one additional first level controller; and
wherein the first level controller is operable to determine the SUPER constraints for each of the plurality of SUPERs based on the sensor information received from each of the plurality of SUPERs and the command information received from the second level controller, wherein the SUPER constraints are determined so that power transmission to and/or from each of the plurality of SUPERs is coordinated in aggregate by the first level controller for optimization of power distribution across the plurality of SUPERs under control of the first level controller and the second plurality of SUPERs.

14. The SSPS system of claim 13 wherein the controller includes the standardized input interface, and wherein the controller is configured to operate based on the commands received via the standardized input interface.

15. The SSPS system of claim 13 wherein the controller includes the standardized output interface, and wherein the first level controller is standardized to receive sensor information according to the standardized output interface from the plurality of SUPERs.

16. The SSPS system of claim 13 wherein the plurality of converter classes includes an AC source interface (ACSI) and a DC source interface (DCSI).

17. The SSPS system of claim 16 wherein the plurality of converter classes includes a grid interface (GI).

18. The SSPS system of claim 13 wherein the IPS is operable to receive DC power at the power input and to generate AC power at the power output.

19. The SSPS system of claim 18 wherein the AC power is single-phase or three-phase power.

20. The SSPS system of claim 13 wherein the controller is operable to direct power regulation and control modes for apparent power and reactive power.

21. The SSPS system of claim 13 wherein the IPS is configured to transfer power from the power input to the power output according to IPS constraints received from the controller, wherein the controller determines the IPS constraints based on the SUPER constraints.

22. The SSPS system of claim 13 wherein the IPS is configured to communicate IPS sensor information to the controller, and wherein the controller is configured to determine the sensor information based on the IPS sensor information.

23. The SSPS system of claim 13 wherein, based on the SUPER constraints received from the first level controller, the controller is configured to direct operation of the IPS to control voltage, current, phase, and balancing.

24. The SSPS system of claim 13, wherein the health information includes one or more of on-state resistance, junction temperature, and gate leakage current.

25. The SSPS system of claim 13, wherein the SUPER includes a plurality of IPSs, wherein the SUPER is configured to transmit IPS control information to the each of the plurality of IPSs to affect operation of each of the plurality of IPSs.

26. The SSPS system of claim 13, wherein the SUPER includes a communication control protection and synchronization architecture to coordinate components of the SUPER including the IPS, and wherein the first and second level controllers communicate with the controller of the SUPER via a separate communication architecture.

* * * * *